(12) United States Patent
Ahn

(10) Patent No.: US 7,782,436 B2
(45) Date of Patent: Aug. 24, 2010

(54) LIQUID CRYSTAL DISPLAY DEVICE

(75) Inventor: Byung Chul Ahn, Ahnyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/457,844

(22) Filed: Jun. 23, 2009

(65) Prior Publication Data
US 2009/0261334 A1 Oct. 22, 2009

Related U.S. Application Data

(62) Division of application No. 11/312,714, filed on Dec. 21, 2005, now Pat. No. 7,564,529.

(30) Foreign Application Priority Data
Dec. 31, 2004 (KR) .................... 10-2004-0118608

(51) Int. Cl.
*G02F 1/1343* (2006.01)
(52) U.S. Cl. .................... 349/147; 349/141; 349/38; 349/39
(58) Field of Classification Search ............... 349/141, 349/147, 38, 39
See application file for complete search history.

(56) References Cited
U.S. PATENT DOCUMENTS
6,611,309 B2 * 8/2003 Park et al. ................ 349/141
6,642,972 B2 * 11/2003 Yoo et al. .................. 349/40
6,771,328 B2 * 8/2004 Park et al. .................. 349/42
7,220,612 B2 * 5/2007 Ahn et al. .................. 438/30
7,626,206 B2 * 12/2009 Ahn et al. .................. 257/79
2006/0146212 A1 * 7/2006 Ahn et al. .................. 349/42
2006/0146245 A1 * 7/2006 Ahn et al. .................. 349/139
2006/0146256 A1 * 7/2006 Ahn ......................... 349/141
2006/0290867 A1 * 12/2006 Ahn et al. .................. 349/141
2007/0002249 A1 * 1/2007 Yoo et al. ................... 349/141
2008/0117344 A1 * 5/2008 Kim et al. .................. 349/39

* cited by examiner

*Primary Examiner*—Mike Qi
(74) *Attorney, Agent, or Firm*—McKenna Long & Aldridge LLP

(57) ABSTRACT

A thin film transistor substrate of fringe field switching type and a fabricating method thereof for simplifying a process are disclosed. In the thin film transistor substrate of fringe field switching type, a gate line has a multiple-layer structure and includes a transparent conductive layer. A data line crosses the gate line to define a pixel area. A thin film transistor is connected to the gate line and the data line. A common line is provided in a multiple-layer structure and in parallel to the gate line. A common electrode is formed by an extension of a transparent conductive layer of the common line at said pixel area. A pixel electrode is connected to the thin film transistor to form a fringe field with the common electrode in the pixel area.

14 Claims, 24 Drawing Sheets

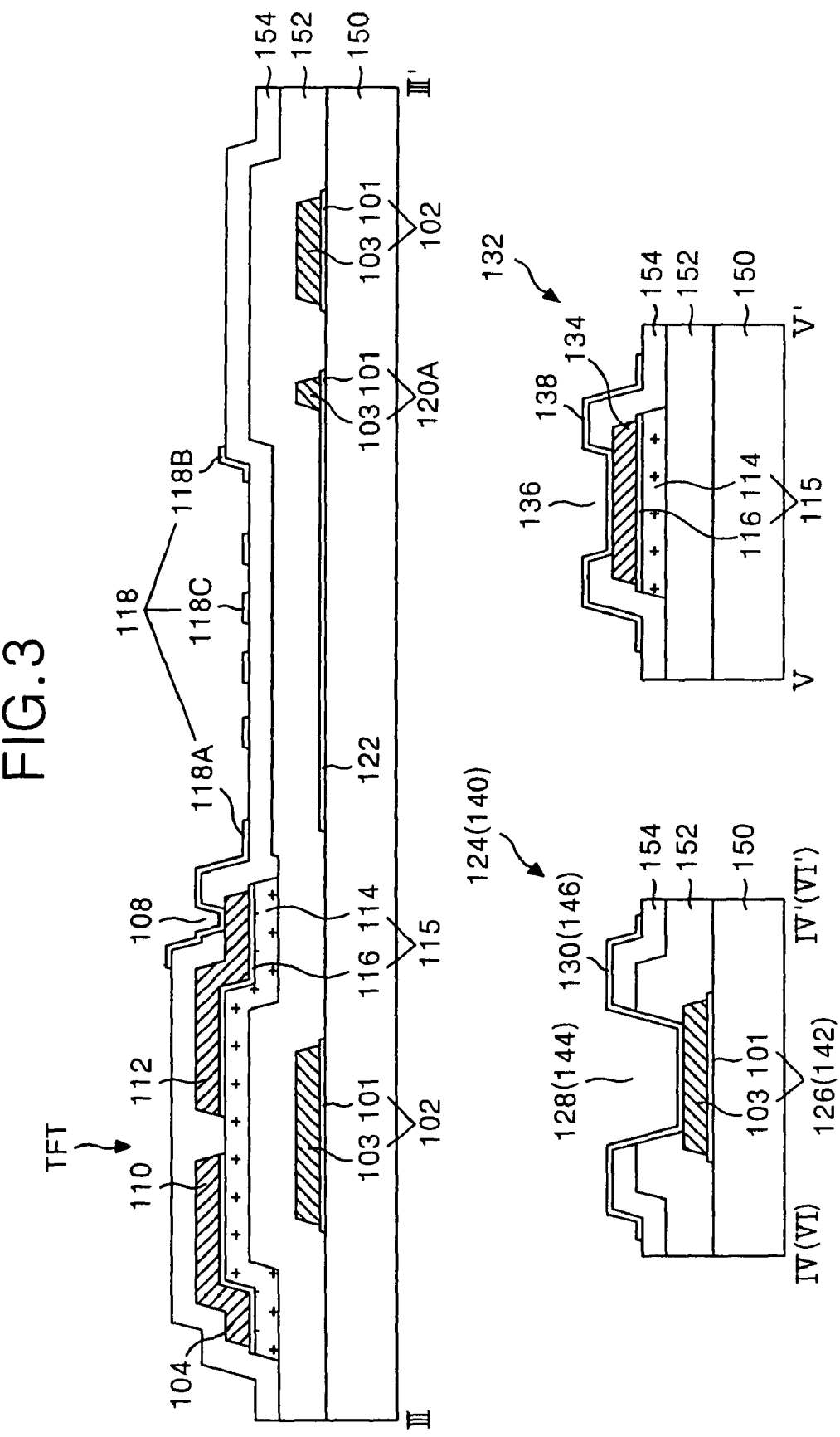

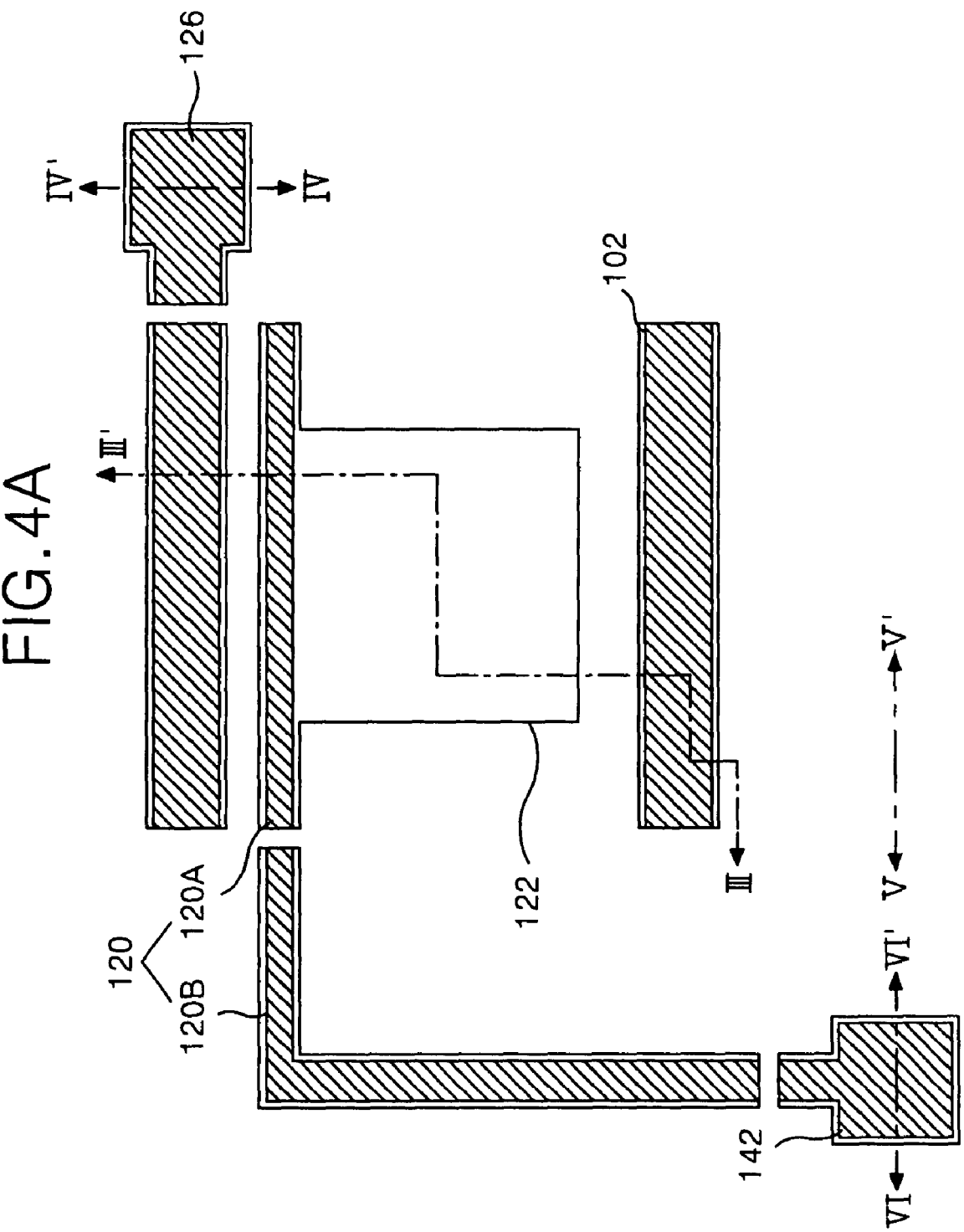

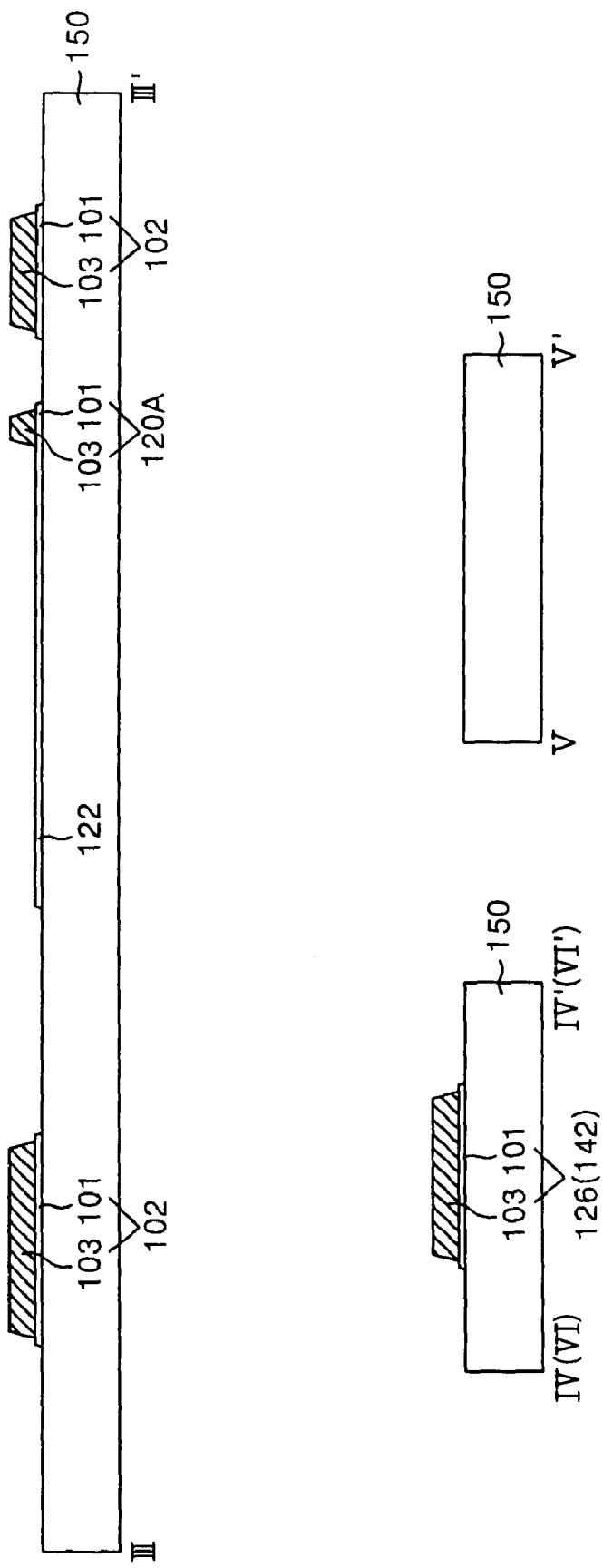

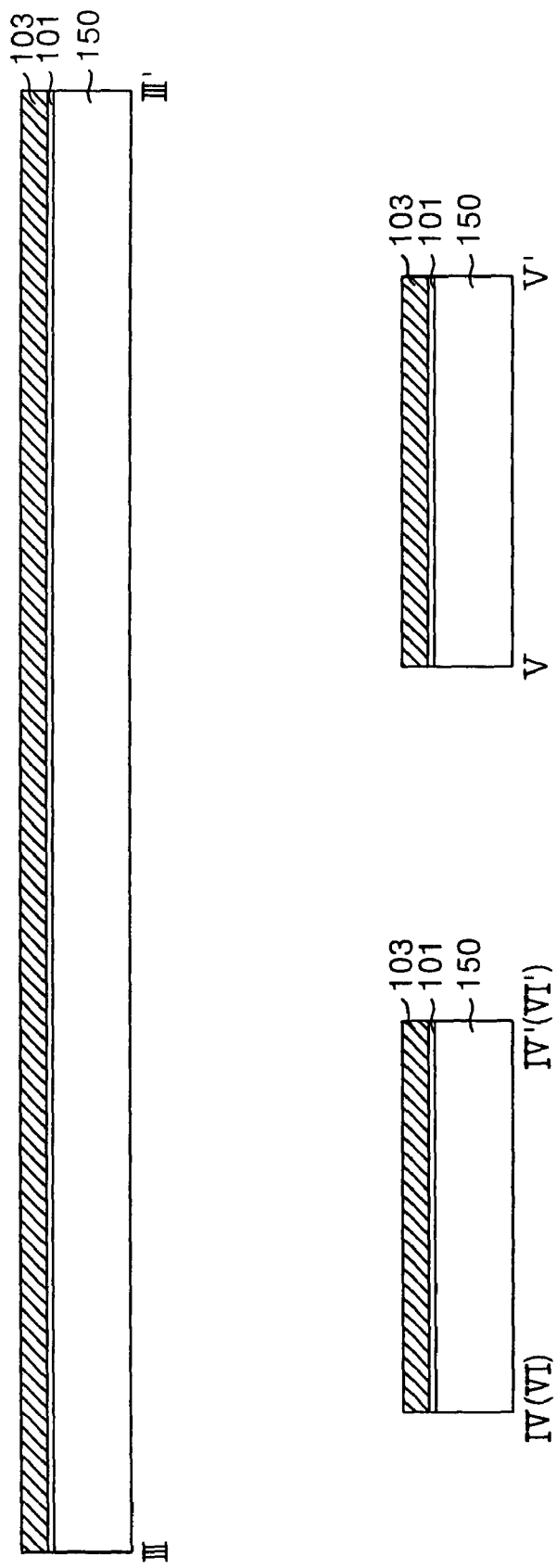

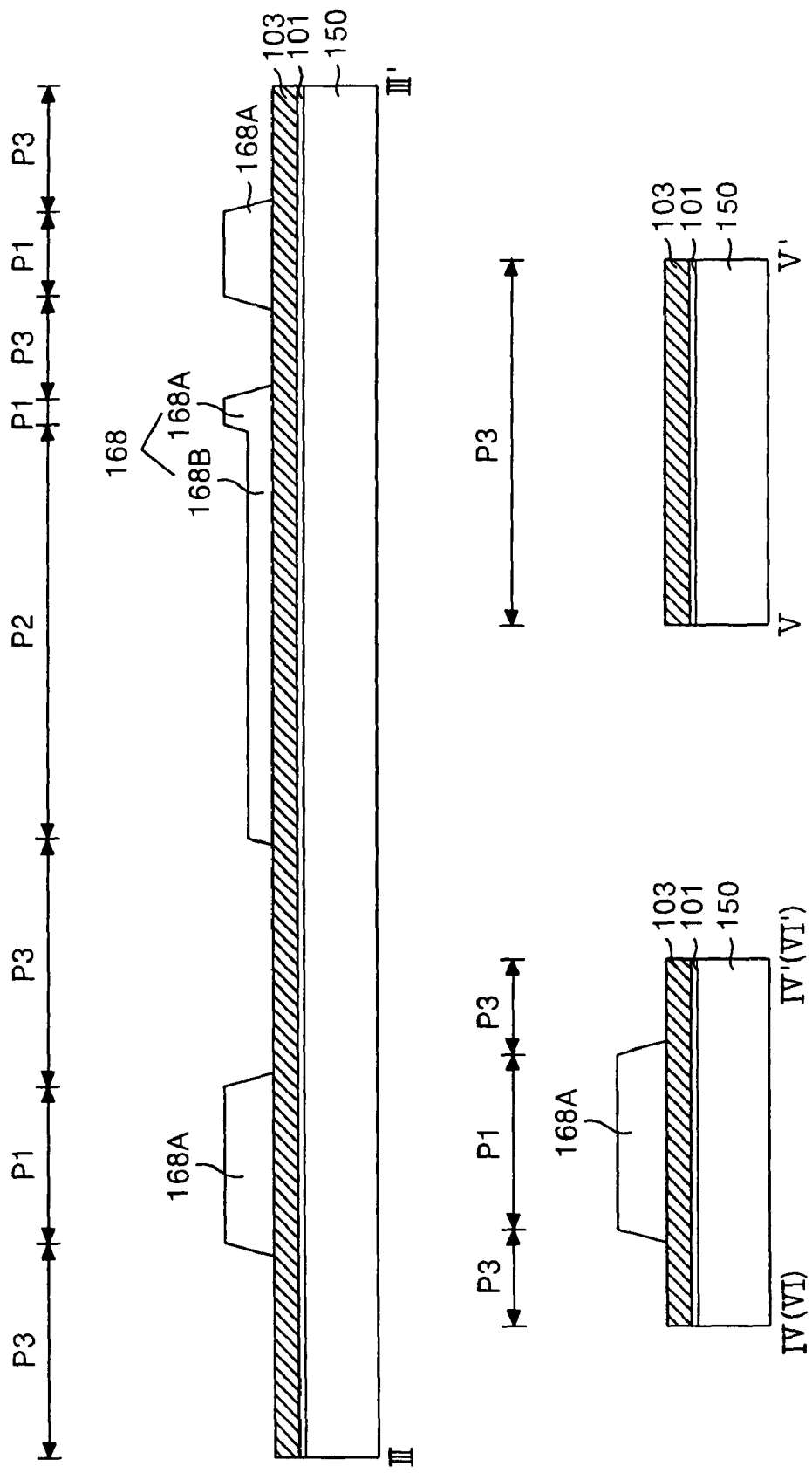

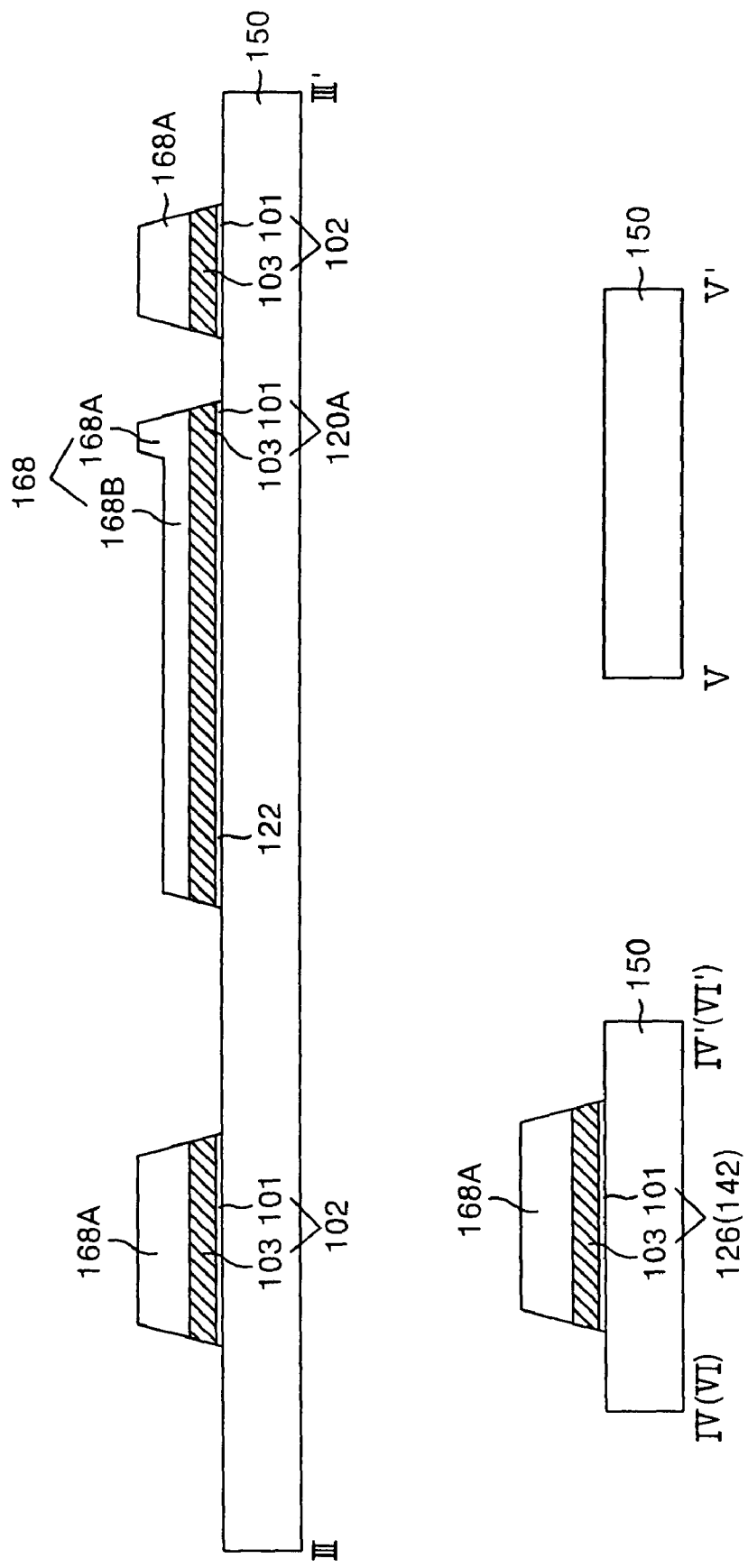

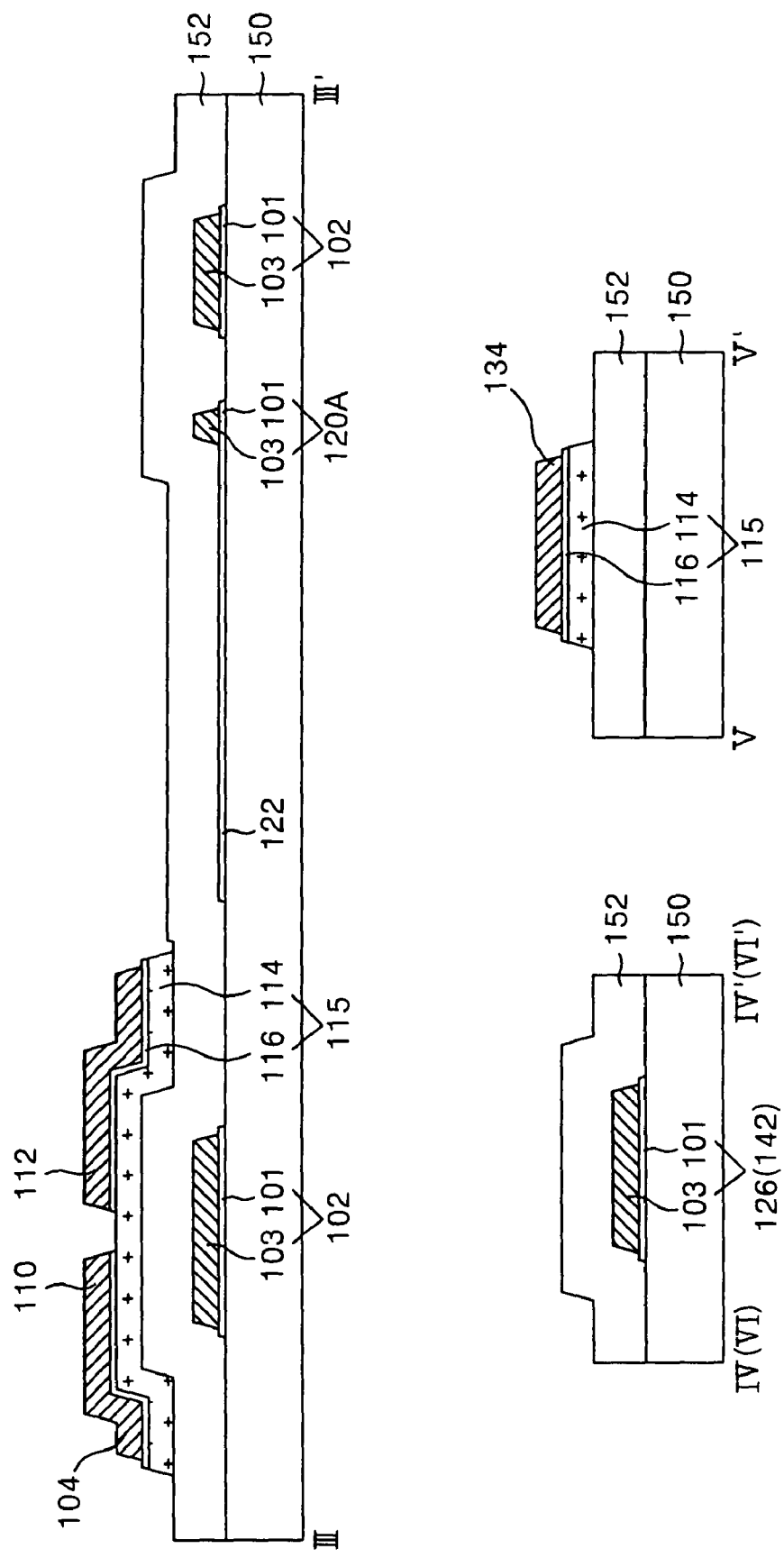

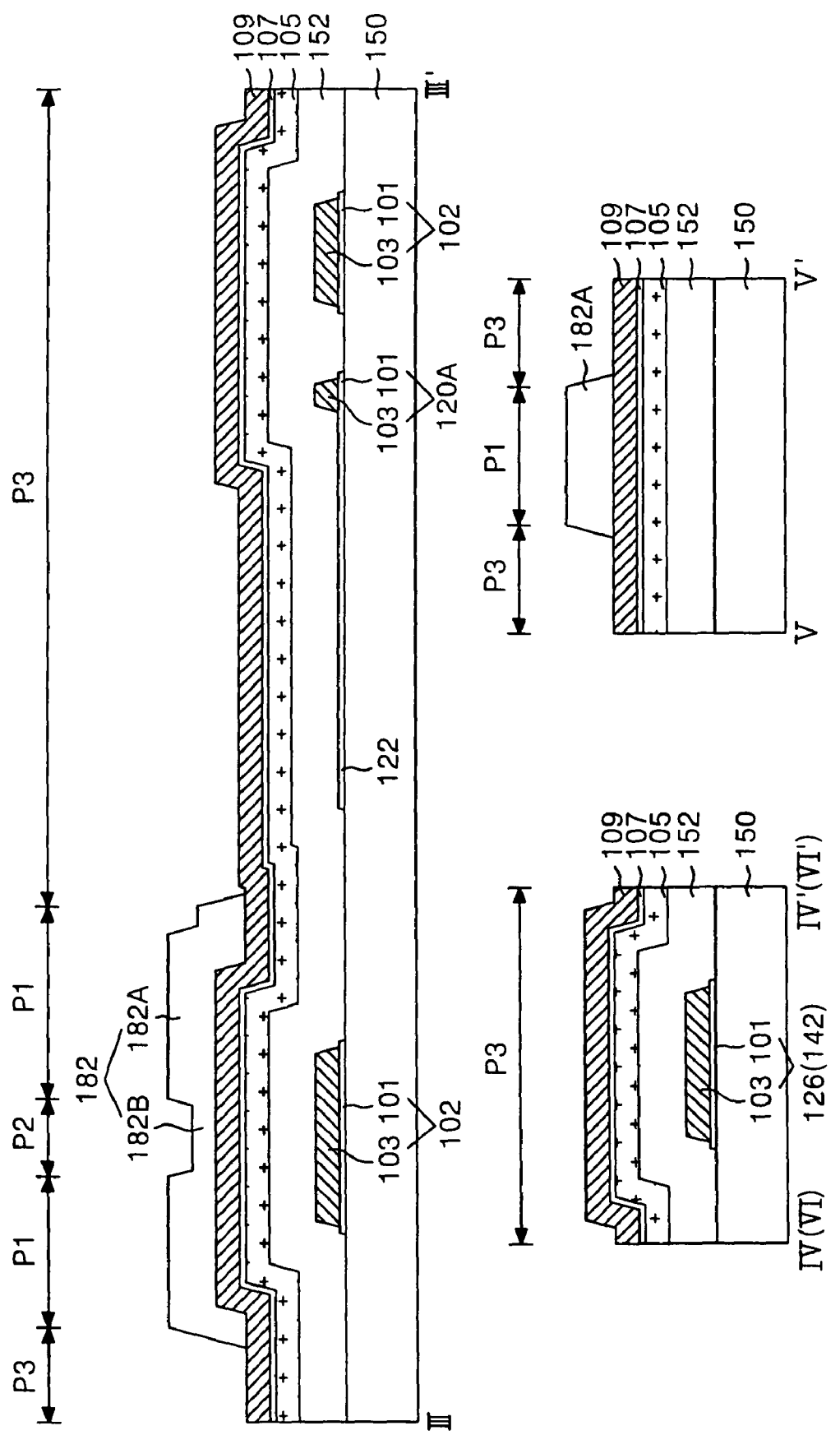

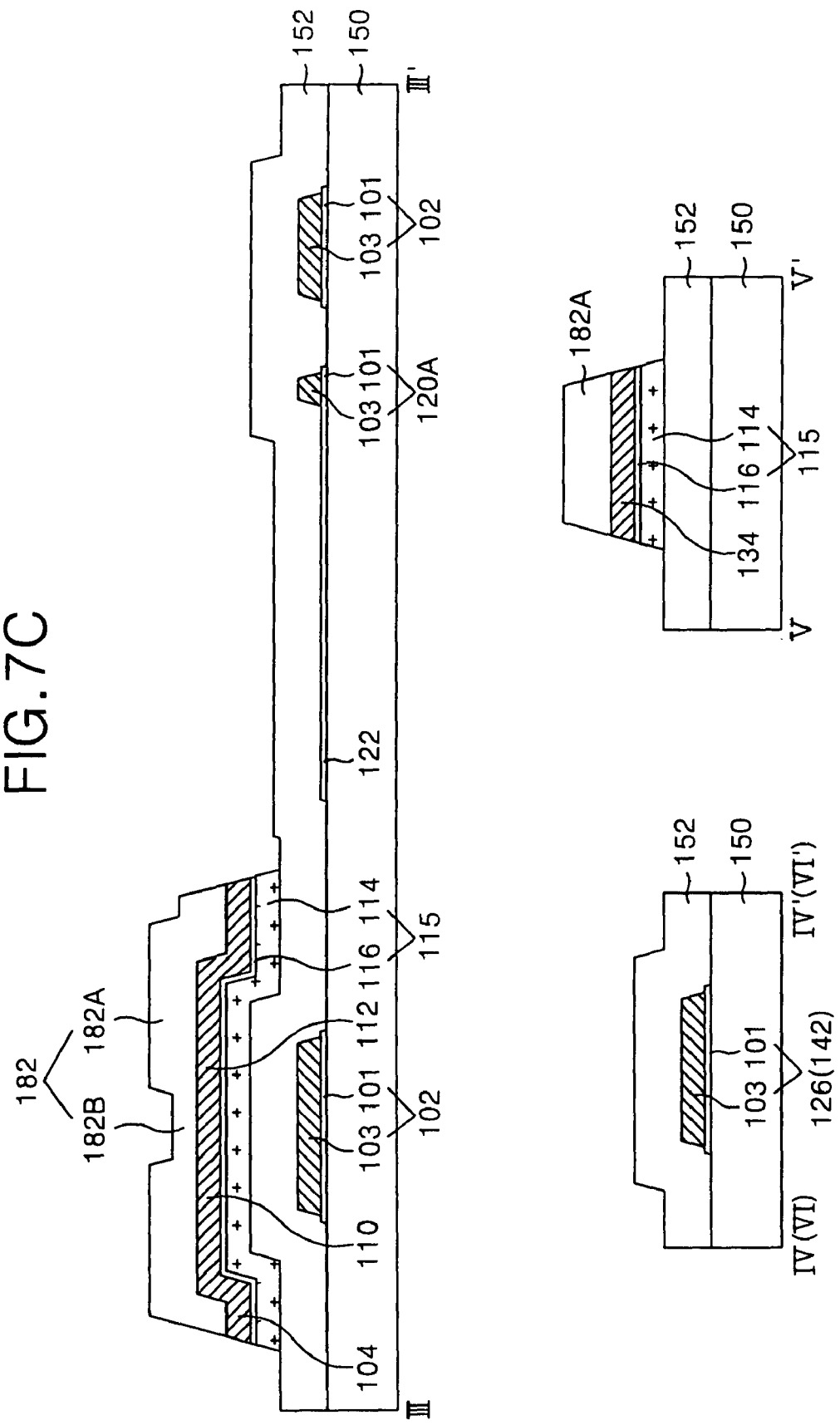

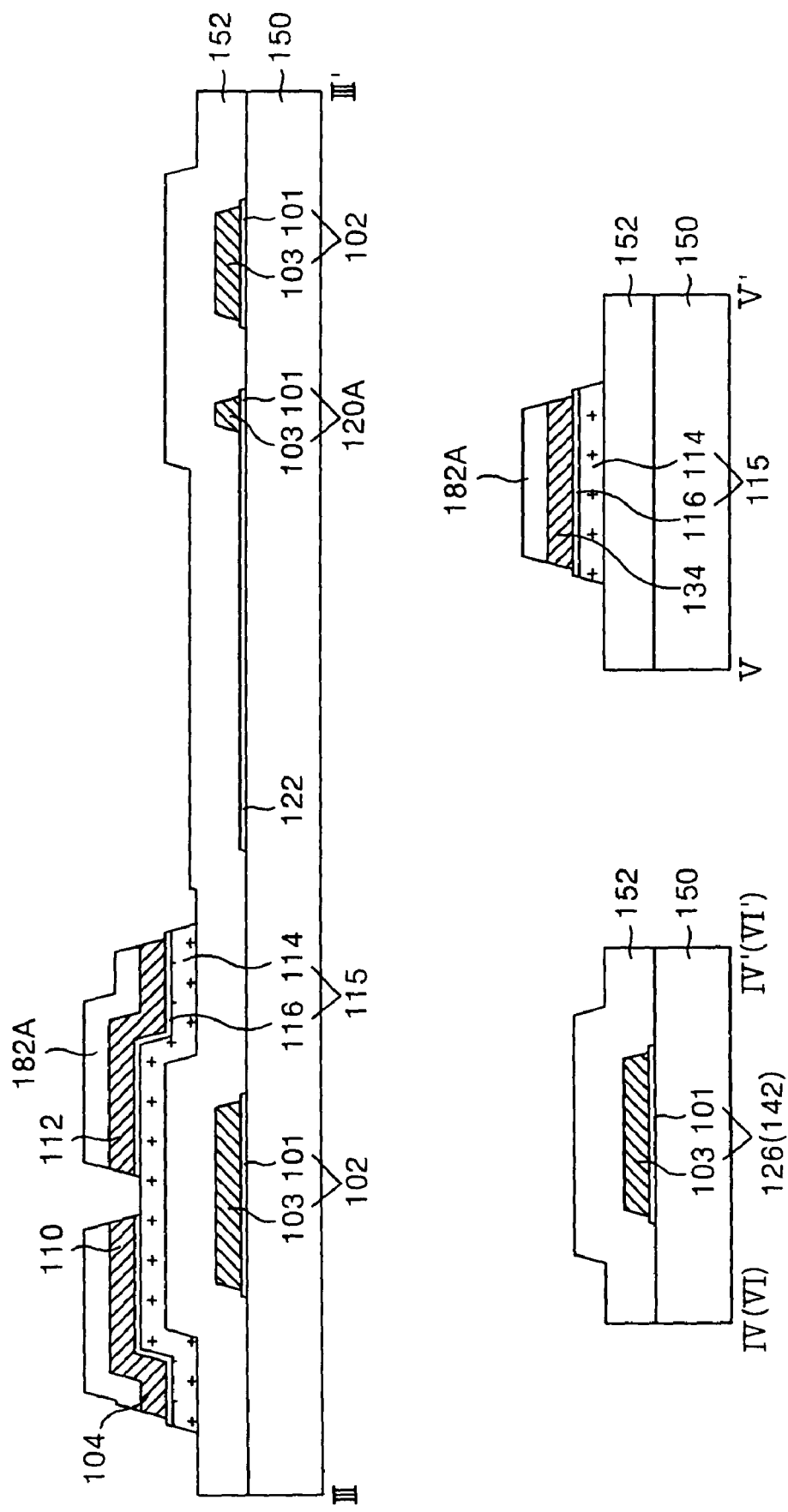

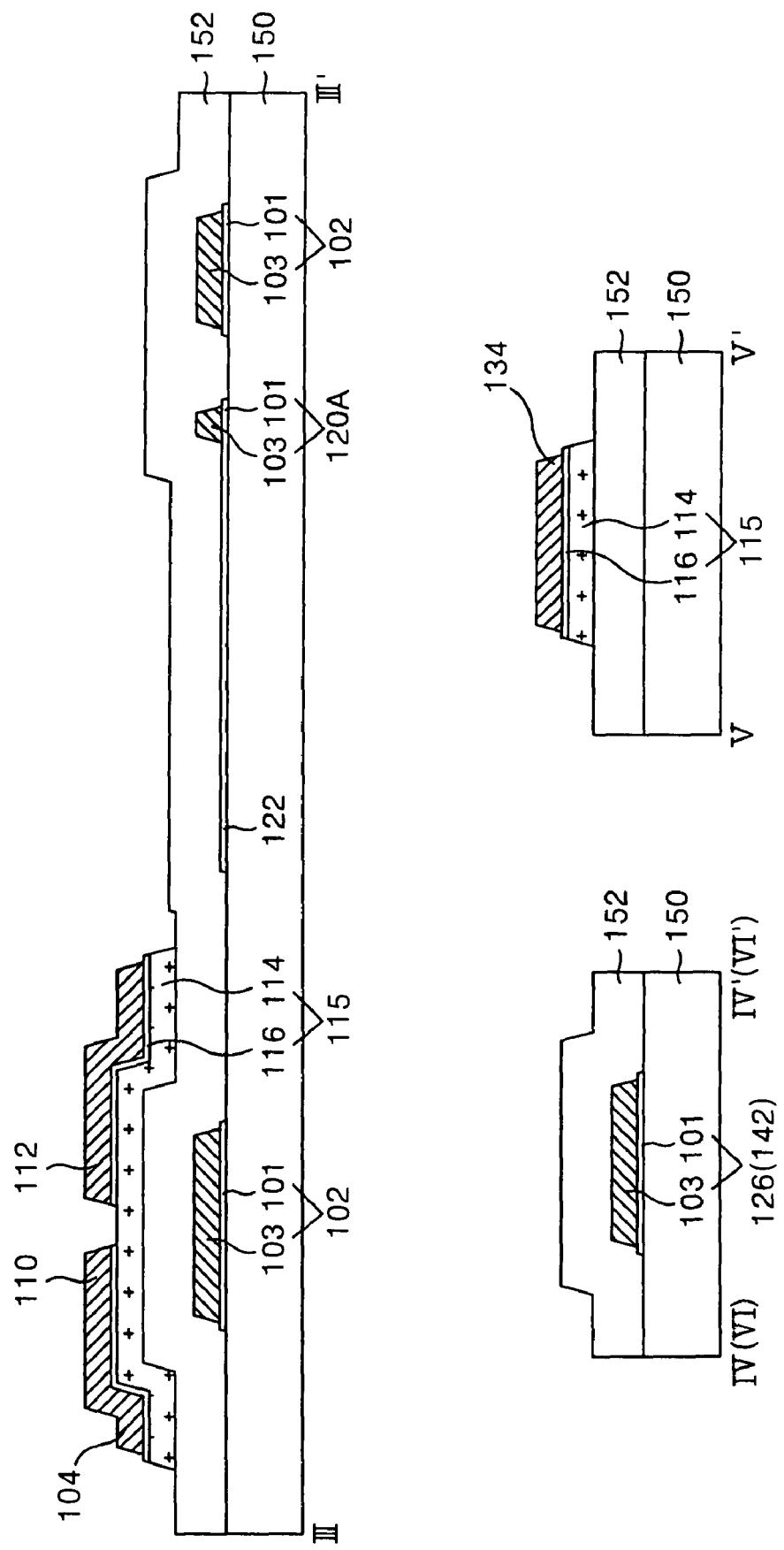

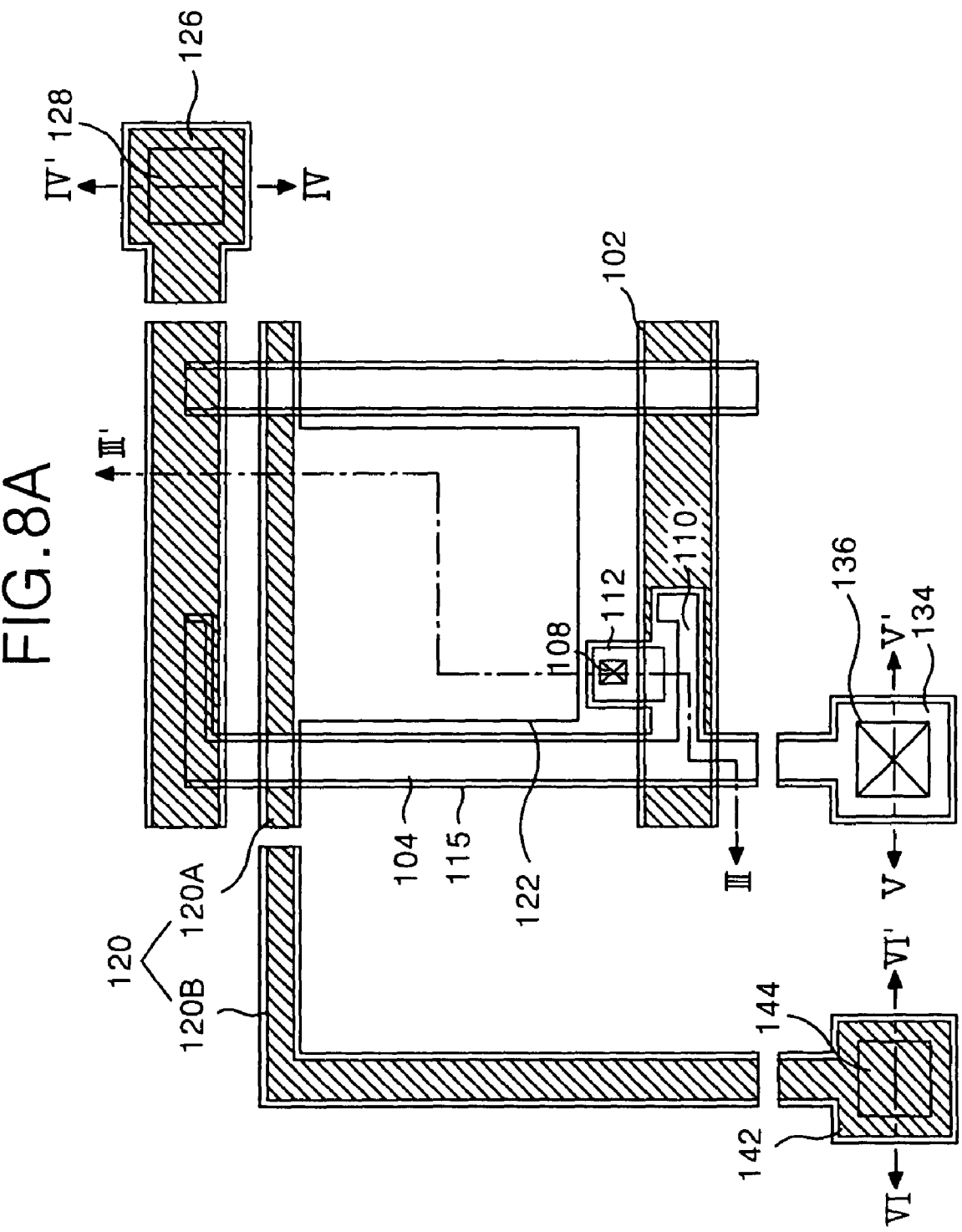

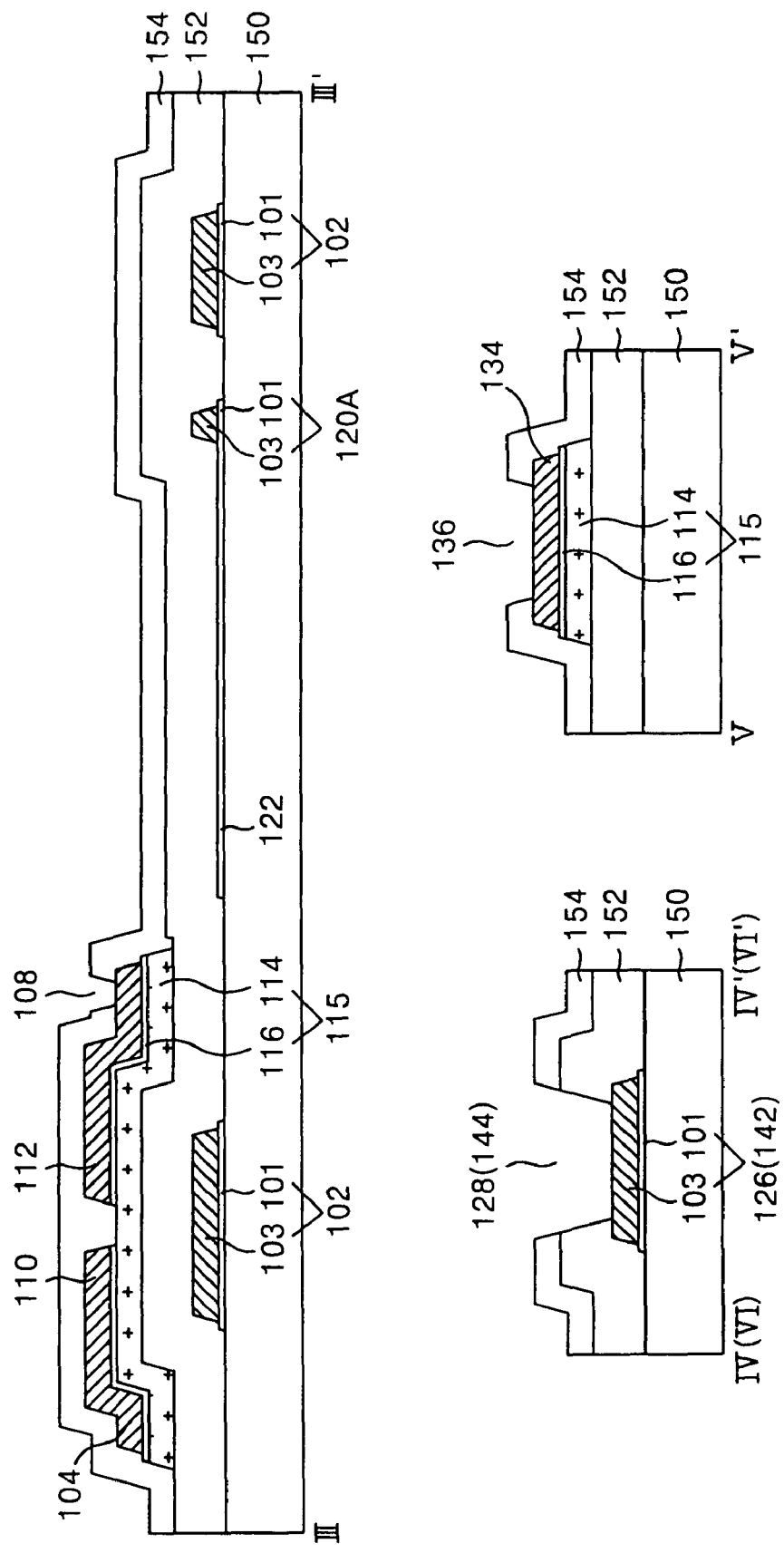

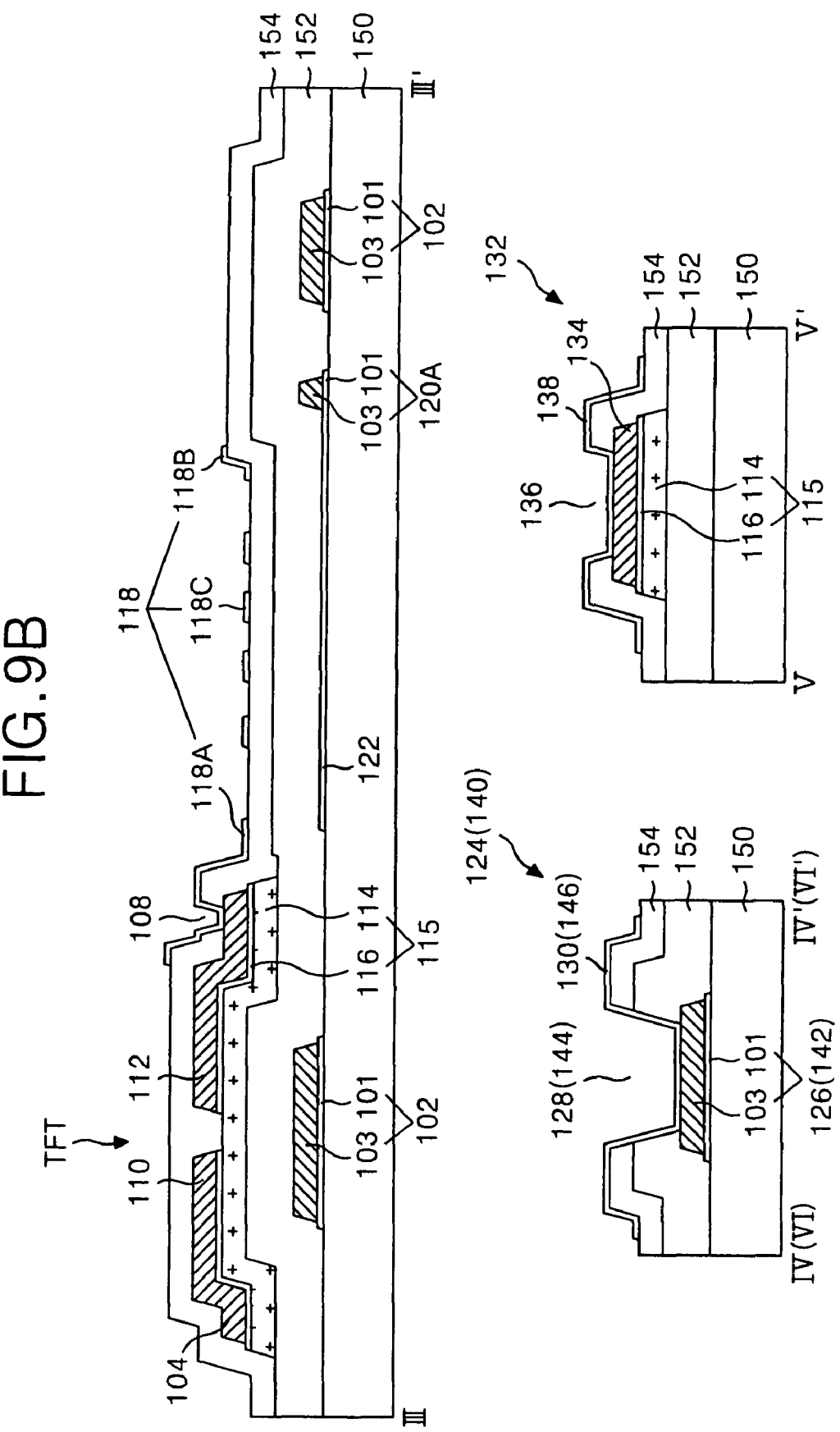

LIQUID CRYSTAL DISPLAY DEVICE

CROSS-REFERENCE TO RELATED APPLICATIONS

This application is a Divisional of application Ser. No. 11/312,714 filed Dec. 21, 2005, now U.S. Pat. No. 7,564,529; which claims priority to Korean Patent Application No. 10-2004-0118608, filed Dec. 31, 2004 all of which are hereby incorporated by reference for all purposes as if fully set forth herein.

BACKGROUND OF THE INVENTION

1. Field of the Invention

This invention relates to a liquid crystal display of fringe field switching type, and more particularly to a thin film transistor substrate of fringe field switching type and a fabricating method thereof that are adaptive for simplifying a process.

2. Description of the Related Art

Generally, a liquid crystal display device controls light transmittance of a liquid crystal having a dielectric anisotropy using an electric field to thereby display a picture. To this end, a liquid crystal display device includes a liquid crystal display panel (hereinafter, a liquid crystal panel) for displaying a picture by a liquid crystal cell matrix, and a driving circuit for driving the liquid crystal display panel.

Referring to FIG. 1, a related art liquid crystal display panel is comprised of a color filter substrate 10 and a thin film transistor substrate 20 that are joined to each other with a liquid crystal 24 therebetween.

The color filter substrate 10 includes a black matrix 4, a color filter 6 and a common electrode 8 that are sequentially provided on an upper glass substrate 2. The black matrix 4 is provided in a matrix type on the upper glass substrate 2. The black matrix 4 divides an area of the upper glass substrate 2 into a plurality of cell areas to be provided with the color filter 6, and prevents a light interference between adjacent cells and an external light reflection. The color filter 6 is provided at the cell area and divided by the black matrix 4 into red (R), green (G) and blue (B) filters, thereby transmitting red, green and blue light. The common electrode 8 is formed of a transparent conductive layer entirely coated onto the color filter 6, and supplies a common voltage Vcom that serves as a reference voltage upon driving of the liquid crystal 24. Further, an overcoat layer (not illustrated) for smoothing the color filter 6 may be provided between the color filter 6 and the common electrode 8.

The thin film transistor substrate 20 includes a thin film transistor 18 and a pixel electrode 22 provided for each cell area defined by a crossing of a gate line 14 and a data line 16 at a lower glass substrate 12. The thin film transistor 18 applies a data signal from the data line 16 to the pixel electrode 22 in response to a gate signal from the gate line 14. The pixel electrode 22 formed of a transparent conductive layer supplies a data signal from the thin film transistor 18 to drive the liquid crystal 24.

The liquid crystal 24 having a dielectric anisotropy is rotated in accordance with an electric field formed by a data signal from the pixel electrode 22 and a common voltage Vcom from the common electrode 8 to control light transmittance, thereby implementing a gray scale level.

Further, a liquid crystal display panel includes a spacer (not illustrated) for uniformly maintaining a cell gap between the color filter substrate 10 and the thin film transistor substrate 20. The spacer may be a ball spacer or a column spacer.

In such a liquid crystal display panel, the color filter substrate 10 and the thin film transistor substrate 20 are formed by a plurality of mask processes. Herein, one mask process includes a number of processes such as thin film deposition (coating), cleaning, photolithography (hereinafter, photo process), etching, photo-resist stripping and inspection processes. Particularly, since the thin film transistor substrate includes the semiconductor process and requires the plurality of mask processes, it has a complicate fabricating process to act as a major factor in the manufacturing cost rise of the liquid crystal display panel.

Meanwhile, the liquid crystal display panel is largely classified into a vertical electric field applying type and a horizontal electric field applying type depending upon with a direction of the electric field driving the liquid crystal.

The liquid crystal display panel of vertical electric field applying type drives a liquid crystal in a twisted nematic (TN) mode with a vertical electric field formed between a pixel electrode and a common electrode arranged in opposition to each other on the upper and lower substrate. The liquid crystal display panel of vertical electric field applying type has an advantage of a large aperture ratio while having a drawback of a narrow viewing angle about 90°.

The liquid crystal display panel of horizontal electric field applying type drives a liquid crystal in an in plane switching (IPS) mode with a horizontal electric field between the pixel electrode and the common electrode arranged in parallel to each other on the lower substrate. The liquid crystal display panel of horizontal electric field applying type has an advantage of a wide viewing angle about 160°, but has a disadvantage of low aperture ratio and transmittance.

Recently, in order to overcome the disadvantage of the liquid crystal display panel of horizontal electric field applying type, there has been suggested a liquid crystal display panel of fringe field switching (FFS) type operated by a fringe field. The FFS-type liquid crystal display panel includes a common electrode and a pixel electrode having an insulating film therebetween at each pixel area. Further, the fringe field allows all of liquid crystal molecules filled between the upper and lower substrates to be operated at each pixel area to thereby improve an aperture ratio and a transmittance.

However, because the thin film transistor substrate included in the FFS-type liquid crystal display panel also requires a plurality of mask processes including a semiconductor process, it has a problem of a complicate fabricating process.

SUMMARY OF THE INVENTION

Accordingly, it is an advantage of the present invention to provide a thin film transistor substrate of fringe field switching type and a fabricating method thereof that are adaptive for simplifying a process.

In order to achieve these and other advantages of the invention, a liquid crystal display device according to one aspect of the present invention includes a gate line having a multiple-layer structure of a transparent conductive layer; a data line crossing the gate line to define a pixel area; a thin film transistor connected to the gate line and the data line; a common line in parallel to the gate line and having the multiple-layer structure; a common electrode extended from a transparent conductive layer of the common line and formed in the pixel area; and a pixel electrode connected to the thin film transistor and overlapped with the common electrode in the pixel area to form a fringe field.

In the liquid crystal display device, a storage capacitor provided such that the common electrode overlaps with the pixel electrode with an insulating film.

In the liquid crystal display device, the common electrode has a plate shape and the pixel electrode has a rib shape.

In the liquid crystal display device, the pixel electrode overlaps with the common electrode with a gate insulating film between the gate line and data line and a protective film on the data line.

In the liquid crystal display device, the pixel electrode is connected to a drain electrode of the thin film transistor via a contact hole passing through the protective film.

In the liquid crystal display device, a semiconductor pattern extends along the data line.

The liquid crystal display device further includes a pad connected to at least one of the gate line, the data line and the common line, wherein the pad includes a lower pad electrode connected to the at least one line; and an upper pad electrode connected to the lower pad electrode via the contact hole.

In the liquid crystal display device, the lower pad electrode connected to the at least one of the common line and gate line having a multiple-layer structure.

In the liquid crystal display device, said lower pad electrode connected to the data line overlaps with the semiconductor pattern extended along the data line.

In the liquid crystal display device, the multiple-layer structure of the transparent conductive layer is a layer structure having the transparent conductive layer and the upper conductive layer and having step coverage taking a stepwise shape.

The liquid crystal display device further includes a shielding pattern on the common electrode along at least one outer side of the common electrode.

In the liquid crystal display device, said pixel electrode is formed on a basis of the common line.

The liquid crystal display device further includes at least one shielding pattern extended, in parallel to the data line, from the common line.

The liquid crystal display device further includes a shielding pattern formed along at least one outer side of the common electrode.

A method of fabricating a liquid crystal display device according to another aspect of the present invention includes a first mask process forming a first mask pattern group including a gate line and a common line having a multiple-layer structure of a transparent conductive layer, a common electrode extended from a transparent conductive layer of the common electrode on a substrate; a second mask process forming a gate insulating film on the first mask pattern group and the semiconductor pattern on the gate insulating film, and a source/drain metal pattern including a data line, a source electrode and a drain electrode overlapped on the semiconductor pattern; a third mask process forming a protective film on the source/drain metal pattern and a contact hole for exposing the drain electrode; a fourth mask process forming a pixel electrode connected to the drain electrode via the contact hole and overlapped with the common electrode.

In the method, a storage capacitor is provided such that the common electrode overlaps with the pixel electrode with the gate insulating film and the protective film.

In the method, the first mask process includes forming a conductive layer of a multiple-layer structure on the substrate; forming a different thickness of the first and second photo-resist patterns on the conductive layer by a photolithography using one of a half tone mask and a diffractive exposure mask; forming the gate pattern, the common line and a multiple-layer structure of common electrode by patterning the conductive layer of the multiple-layer structure by an etching process using the first and second photo-resist patterns; removing the second photo-resist pattern and an upper conductive layer of the exposed common electrode to thereby expose the transparent conductive layer; and removing the first photo-resist pattern.

In the method, the first mask process includes forming a lower pad electrode of the multiple-layer structure connected to at least one of the gate line and the common line, the third mask process includes forming a second contact hole for exposing the lower pad electrode, and the fourth mask process includes forming an upper pad electrode connected to the lower pad electrode via the second contact hole.

In the method, the second mask process includes forming a lower pad electrode extended, along with the semiconductor pattern, from the data line, the third mask process includes forming a second contact hole for exposing the lower pad electrode, and the fourth mask process includes forming an upper pad electrode connected, to the lower pad electrode via the second contact hole.

In the method, the upper conductive layer or the source/drain metal layer of the conductive layer of the multiple-layer structure includes one of a single layer formed of one of Mo, Ti, Cu, AlNd, Al, Cr, a Mo-alloy, a Cu-alloy or an Al-alloy, a double layer and a triple layer formed of one of Al/Cr, Al/Mo, Al(Nd)/Al, Al(Nd)/Cr, Mo/Al(Nd)/Mo, Cu/Mo, Ti/Al(Nd)/Ti, Mo/Al, Mo/Ti/Al(Nd), Cu-alloy/Mo, Cu-alloy/Al, Cu-alloy/Mo-alloy, Cu-alloy/Al-alloy, Al/Mo-alloy, Mo-alloy/Al, Al-alloy/Mo-alloy, Mo-alloy/Al-alloy, Mo/Al-alloy, Cu/Mo-alloy, Cu/Mo(Ti).

The method further includes forming a shielding pattern on the common electrode along at least one outer side of the common electrode.

In the method, the pixel electrode is formed on a basis of the common line.

The method further includes forming at least one shielding pattern extended, in parallel to the data line, from the common line.

The method further includes forming a shielding pattern along at least one outer side of the common electrode.

BRIEF DESCRIPTION OF THE DRAWINGS

These and other advantages of the invention will be apparent from the following detailed description of the embodiments of the present invention with reference to the accompanying drawings.

In the drawings:

FIG. 3 is a sectional view of the thin film transistor substrate of horizontal electric field applying type taken along the III-III', IV-IV', V-V' and VI-VI' lines in FIG. 2;

FIG. 4a and FIG. 4b are a plan view and a sectional view for explaining a first mask process in a method of fabricating the thin film transistor substrate of fringe field switching type according to the first embodiment of the present invention, respectively;

FIG. 5a to FIG. 5e are sectional views illustrating the first mask process in FIG. 4a and FIG. 4b;

FIG. 6a and FIG. 6b are a plan view and a sectional view for explaining a second mask process in a method of fabricating the thin film transistor substrate of fringe field switching type according to the first embodiment of the present invention, respectively;

FIG. 7a to FIG. 7e are sectional views illustrating the second mask process in FIG. 6a and FIG. 6b;

FIG. 8a and FIG. 8b are a plan view and a sectional view for explaining a third mask process in a method of fabricating the thin film transistor substrate of fringe field switching type according to the first embodiment of the present invention, respectively;

FIG. 9a and FIG. 9b are a plan view and a sectional view for explaining a fourth mask process in a method of fabricating the thin film transistor substrate of fringe field switching type according to the first embodiment of the present invention, respectively;

DETAILED DESCRIPTION OF THE EMBODIMENTS

Hereinafter, the embodiments of the present invention will be described in detail with reference to the above drawings.

Figure 1:
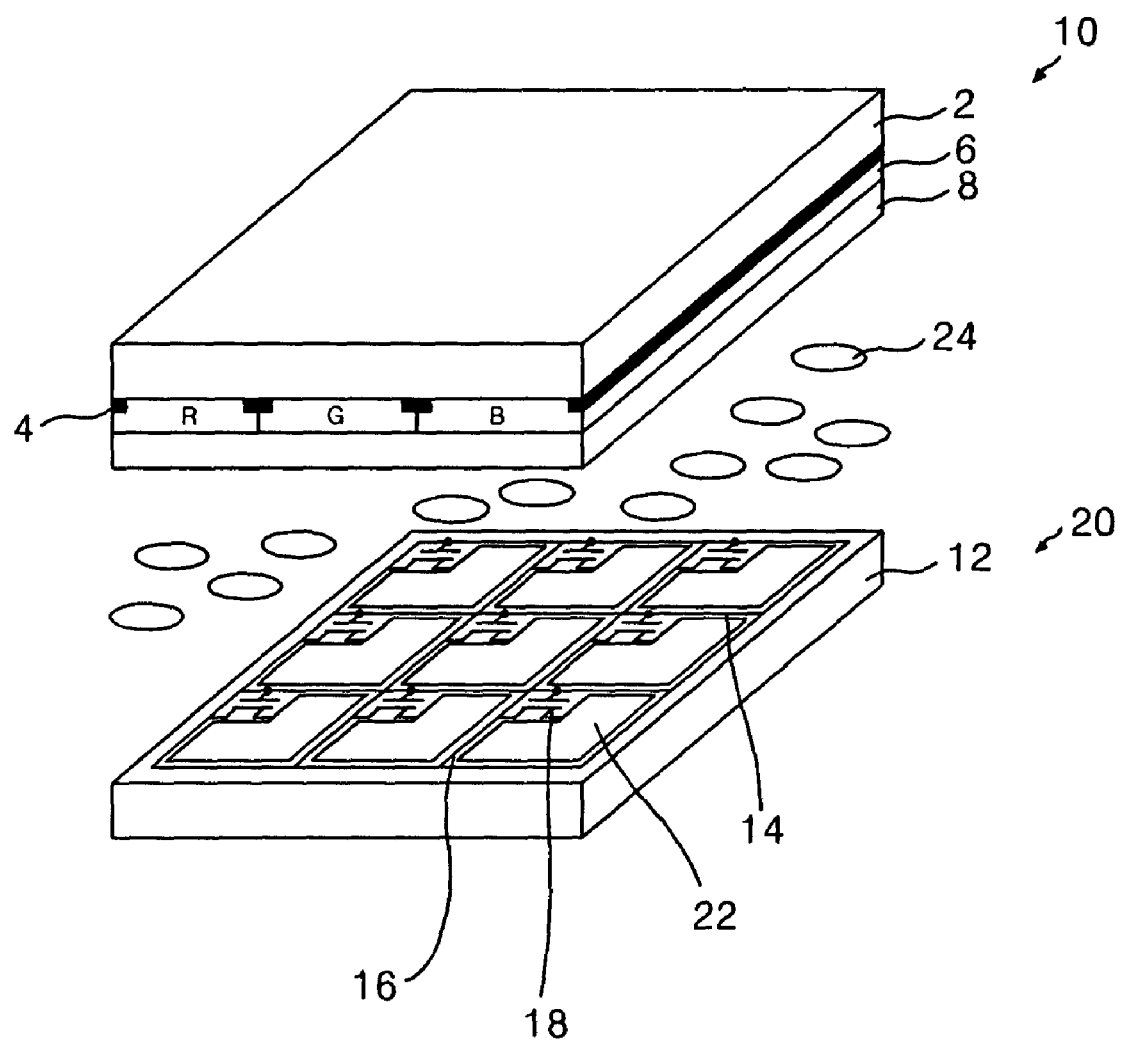
FIG. 1 is a schematic perspective view illustrating a structure of a related art liquid crystal display panel.
Figure 2:
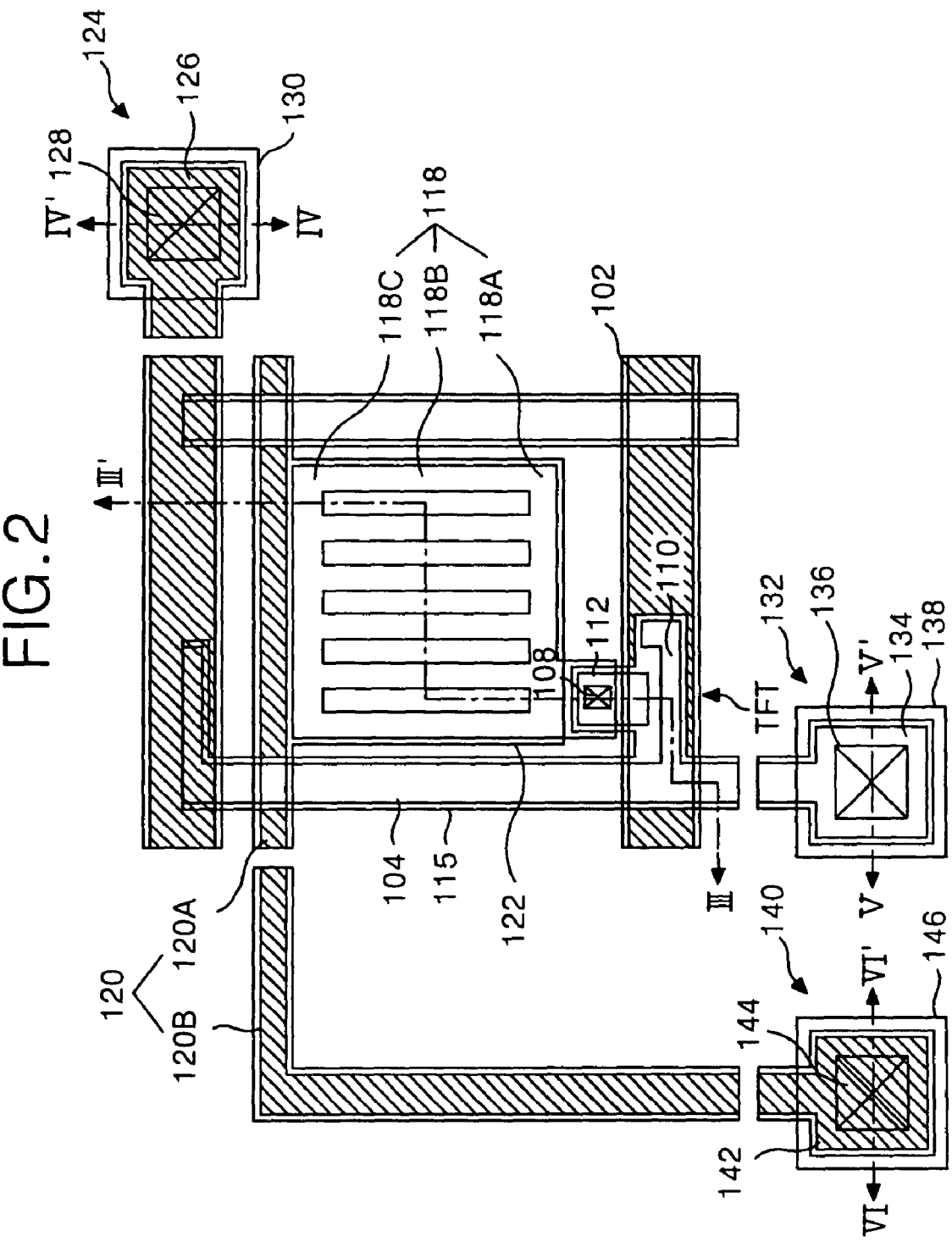
FIG. 2 is a plan view illustrating a structure of a thin film transistor substrate of fringe field switching type according to a first embodiment of the present invention.

A first exemplary embodiment is illustrated in FIG. 3 to FIG. 9b. FIG. 2 is a plan view illustrating a structure of a thin film transistor substrate of fringe field switching (FFS) type according to a first embodiment of the present invention, and FIG. 3 is a sectional view of the thin film transistor substrate taken along the III-III', IV-IV', V-V' and VI-VI' lines in FIG. 2.

Referring to FIG. 2 and FIG. 3, the FFS-type thin film transistor substrate includes a gate line 102 and a data line 104 provided on a lower substrate 142 in such a manner to intersect each other with a gate insulating film 144 therebetween, a thin film transistor 106 connected to each intersection, a pixel electrode 118 provided at a pixel area defined by the intersection structure to be connected to the thin film transistor 106, a common electrode 122 provided, along with the pixel electrode 118, at the pixel area to form a fringe field, and a common line connected to the common electrode 122. Further, the FFS-type thin film transistor substrate includes a gate pad 126 connected to the gate line 102, a data pad 134 connected to the data line 104, and a common pad 140 connected to the common line 120.

The gate line 102 supplies a scanning signal from a gate driver (not illustrated) while the data line 104 supplies a video signal from a data driver (not illustrated). The gate line 102 and the data line 104 cross each other with the gate insulating film 152 therebetween to define the pixel area.

Herein, the gate line 102 is formed on the substrate 150 in a multiple-layer structure having at least double gate metal layers. For instance, as illustrated FIG. 3, the gate line 102 has a double-layer structure in which a first conductive layer 101 employing a transparent conductive layer and a second conductive layer 103 formed of an opaque metal are built. In this case, the first conductive layer 101 is formed of ITO, TO, IZO or ITZO. while the second conductive layer 103 employs Cu, Mo, Al, a Cu-alloy, a Mo-alloy and a Al-alloy. Alternatively, the gate line 102 may be formed of a single layer such as Cu, Mo, Al, a Cu-alloy, a Mo-alloy and a Al-alloy (ex. AlNd). besides the above-mentioned multiple-layer structure.

The thin film transistor TFT allows a video signal applied to the data line 104 to be charged into the pixel electrode 118 and be kept in response to a scanning signal applied to the gate line 102. To this end, the thin film transistor TFT includes a gate electrode included in the gate line 102, a source electrode 110 connected to the data line 104, a drain electrode 112 positioned in opposition to the source electrode 110 to be connected to the pixel electrode 118, an active layer 114 overlapping with the gate line 102 with the gate insulating film 152 therebetween to provide a channel between the source electrode 110 and the drain electrode 112, and an ohmic contact layer 116 formed on the active layer 114 other than the channel portion to make an ohmic contact with the source electrode 110 and the drain electrode 112.

Further, a semiconductor pattern 115 including the active layer 114 and the ohmic contact layer 116 is provided in such a manner to overlap with the data line 104 and a lower data pad electrode 134.

The common line 120 and the common electrode 122 supply a reference voltage for driving the liquid crystal, that is, a common voltage to each pixel.

To this end, the common line 120 includes an internal common line 120A provided in parallel to the gate line 102 at a display area, and an external common line 120B commonly connected to the internal common line 120A at an non-display area. The common line 120 is formed in a layer built structure of the first and second conductive layers 101 and 103 like the gate line 102. Alternatively, the common line 120 may be formed of a single layer such as Cu, Mo, Al, a Cu-alloy, a Mo-alloy and a Al-alloy (ex. AlNd). besides the above-mentioned multiple-layer structure.

The plate-shaped common electrode 122 is provided within the pixel area to be connected to the internal common line 120A. More specifically, the common electrode 122 is extended from the first conductive layer 101 of the internal common line 120A into each pixel area and formed into a plate shape. In other words, the common electrode 122 is formed of a transparent conductive layer being integral to the first conductive layer 101 of the common line 120.

The pixel electrode 118 is connected to the drain electrode 112 of the TFT and overlaps with the common electrode 122 with the gate insulating film 144 and a protective film 154 therebetween at each pixel area to form a fringe field. More specifically, the pixel electrode 118 includes a first horizontal part 118A provided in parallel to the gate line 102, a second horizontal part 118B overlapping with the common line 120A, and a plurality of vertical parts 118C connected between the first and second horizontal parts 118A and 118B. Further, the pixel electrode 118 is connected to the drain electrode 112 exposed through a first contact hole 108. If a video signal is applied, via the thin film transistor TFT, to the pixel electrode 118, then the pixel electrode 118 forms a fringe field along with the plate-shaped common electrode 122 supplied with the common voltage. Liquid crystal molecules arranged in the horizontal direction between the thin film transistor array substrate and the color filter array substrate by such a fringe field is rotated due to a dielectric anisotropy. Transmittance of a light transmitting the pixel area is differentiated depending upon a rotation extent of the liquid crystal molecules, thereby implementing a gray level scale.

Further, the overlapping portion between the common electrode 122 and the pixel electrode 118 is provided with a storage capacitor for stably keeping a video signal applied to the pixel electrode 118.

The gate line 102 is connected, via the gate pad 124, to the gate driver (not illustrated). The gate pad 124 includes a lower gate pad electrode 126 extended from the gate line 102, and an upper gate pad electrode 130 connected, via a second contact hole 128 passing through the gate insulating film 152 and the protective film 154, to the exposed lower gate pad electrode 126. Herein, the lower gate pad electrode 126 has a double layer structure of the first and second conductive layers 101 and 103 like the gate line 102. Alternatively, the lower gate pad electrode 126 may be formed of a single layer such as Cu, Mo, Al, a Cu-alloy, a Mo-alloy and a Al-alloy (ex. AlNd). besides the above-mentioned multiple-layer structure.

The data line 104 connected, via the data pad 132, to a data driver (not illustrated). The data pad 132 includes a lower data pad electrode 134 extended from the data line 104 along with the semiconductor pattern 115 under it, an upper data pad electrode 138 connected to the lower data pad electrode 134 exposed by way of a third contact hole 136 passing through the protective film 154.

The common line 120 receives a reference voltage from a common voltage source (not illustrated) via the common pad 140. The common pad 140 includes a lower common pad electrode 142 extended from the external common line 120B, and an upper common pad electrode 146 connected to the lower common pad electrode 142 exposed by way of a fourth contact hole 144 passing through the gate insulating film 152 and the protective film 154. Herein, the lower common pad electrode 142 has a double-layer structure in which the first and second conductive layers 101 and 103 are built like the common line 120. Alternatively, the lower common pad electrode 142 may be formed of a single layer such as Cu, Mo, Al, a Cu-alloy, a Mo-alloy and a Al-alloy (ex. AlNd). besides the above-mentioned multiple-layer structure.

The FFS-type thin film transistor substrate according to the first embodiment of the present invention having the above-mentioned structure is formed by the following four-round mask process.

FIG. 4a and FIG. 4b are a plan view and a sectional view for explaining a first mask process, respectively, in a method of fabricating the thin film transistor substrate of fringe field switching type according to the first embodiment of the present invention, and FIG. 5a to FIG. 5e are sectional views illustrating the first mask process.

A first mask pattern group including the gate line 102, the lower gate pad electrode 126, the common line 120, the common electrode 122 and the lower common pad electrode 142, is formed on the lower substrate 150 by the first mask process. Herein, the first mask pattern group other than the common electrode 122 has a multiple-layer structure in which at least two conductive layers are built. For the sake of explanation, only a double-layer structure having the first and second conductive layers 101 and 103 built will be discussed.

The common electrode 122 has a single-layer structure of the first conductive layer 101 that is a transparent conductive layer. The first mask pattern group having such multiple-layer structure and single-layer structure is formed by a single of mask process using a partial transmitting mask such as a diffractive exposure mask or a half tone mask. Hereinafter, a case where the half tone mask is used as a first mask will be described.

Referring to FIG. 5a, the first and second conductive layers 101 and 103 are disposed on the lower substrate 150 by a deposition technique such as the sputtering. The first conductive layer 101 is formed of a transparent conductive material such as ITO, TO, IZO or ITZO. On the other hand, the second conductive layer 103 employs a single layer formed of a metal material such as Mo, Ti, Cu, AlNd, Al, Cr, a Mo-alloy, a Cu-alloy or an Al-alloy, or employs a double layer or a triple layer such as Al/Cr, Al/Mo, Al(Nd)/Al, Al(Nd)/Cr, Mo/Al (Nd)/Mo, Cu/Mo, Ti/Al(Nd)/Ti, Mo/Al, Mo/Ti/Al(Nd), Cu-alloy/Mo, Cu-alloy/Mo-alloy, Cu-alloy/Al-alloy, Al/Mo-alloy, Mo-alloy/Al, Al-alloy/Mo-alloy, Mo-alloy/Al-alloy, Mo/Al-alloy, Cu/Mo-alloy and Cu/Mo(Ti) etc.

Referring to FIG. 5b, a second photo-resist pattern 162 having step coverage is formed by the photolithography using a half tone mask. The half tone mask is comprised of a shielding part for shielding an ultraviolet ray, a half-tone transmitting part for partially transmitting the ultraviolet ray using a phase-shifting material, and a full transmitting part for fully transmitting the ultraviolet ray. The first photo-resist pattern 162 including a different thickness of first photo-resist patterns 162A and 162B and an aperture part is formed by the photolithography using a half tone mask. In this case, the relatively thick first photo-resist pattern 162A is provided at a shielding area P1 of the first photo-resist overlapping with the shielding part of the half tone mask; the first photo-resist pattern 162B thinner than the first photo-resist pattern 162A is provided at a half tone exposure area P2 overlapping with the half-tone transmitting part; and the aperture part is provided at an full exposure area P3 overlapping with the full transmitting part.

Referring to FIG. 5c, the exposed portions of the first and second conductive layers 101 and 103 are etched by an etching process using the first photo-resist pattern 162 as a mask, thereby providing the first mask pattern group including a double-layer structure of the gate line 102, the lower gate pad electrode 126, the common line 120, the common electrode 122 and the lower common pad electrode 142.

Figure 5D:
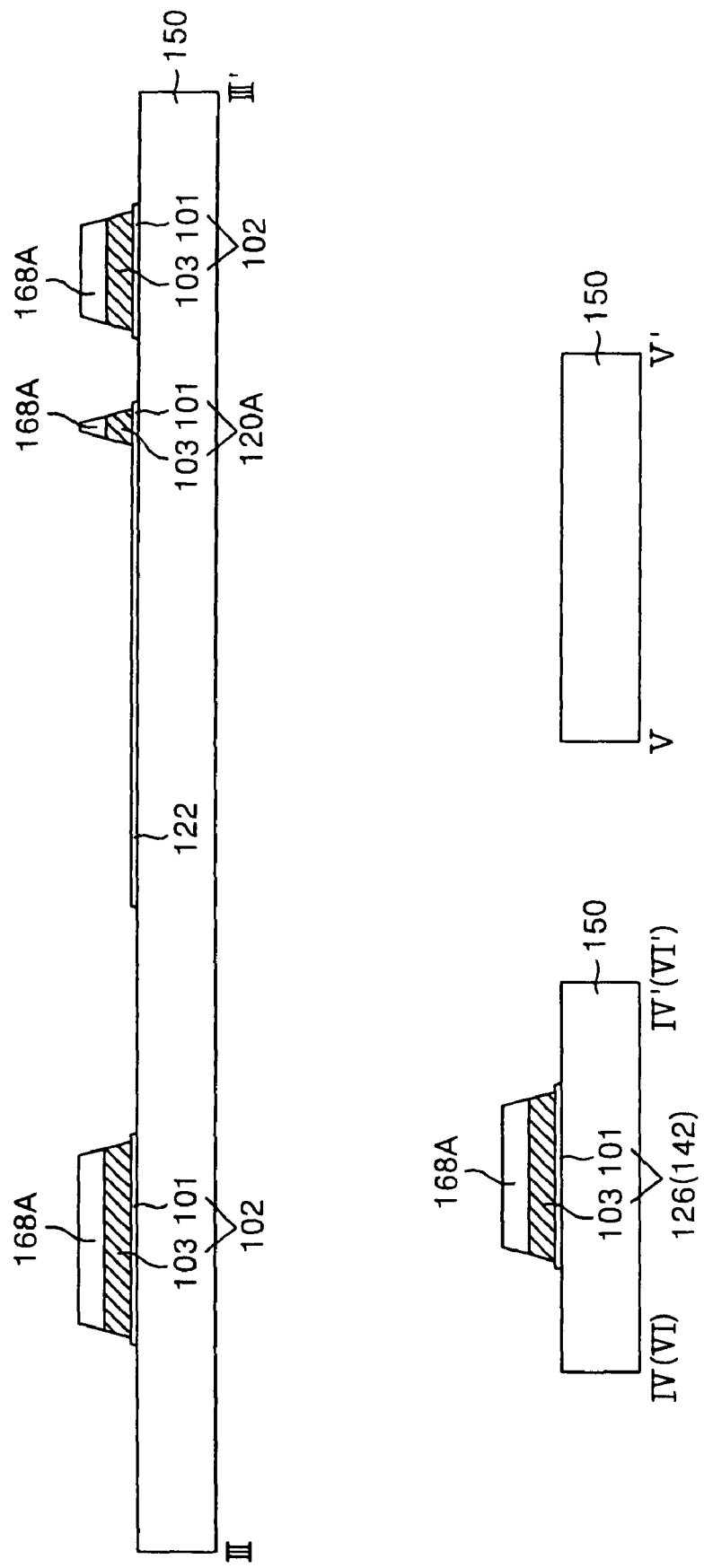

Referring to FIG. 5d, a thickness of the first photo-resist pattern 162A is thinned while the first photo-resist pattern 162B is removed by the ashing process using an oxygen ($O_2$) plasma. Further, the second conductive layer 103 on the common electrode 122 is removed by the etching process using the ashed first photo-resist pattern 162A as a mask. Thus, the plate-shaped common electrode 122 has a structure in which the first conductive layer 101 is formed only of a transparent conductive layer. In this case, each side of the patterned second conductive layer 103 is again etched along the ashed first photo-resist pattern 162A, thereby allowing the first and second conductive layers 101 and 103 of the first mask pattern group to has a constant step coverage in a stepwise shape. Accordingly, when the side surfaces of the first and second conductive layers 101 and 103 have a high steep inclination, it becomes possible to prevent a step coverage badness of the gate insulating film 152 that may be generated thereon.

Figure 5E:
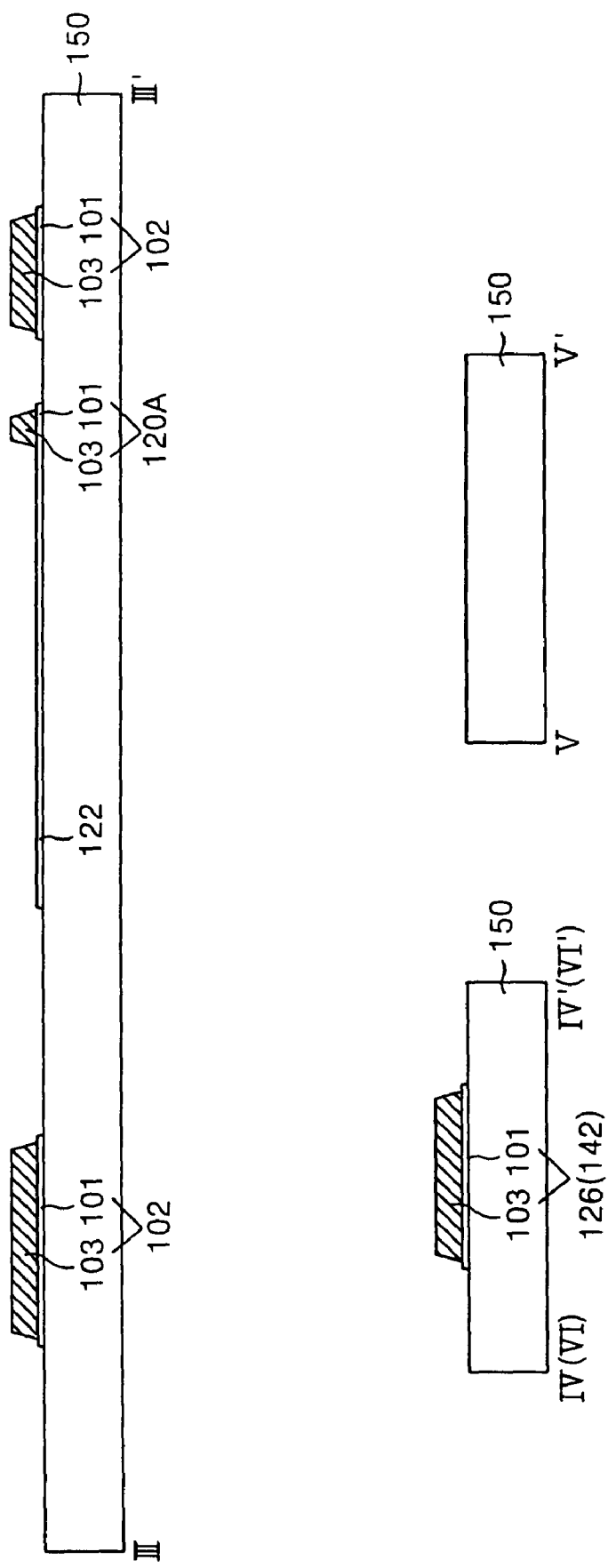

Referring to FIG. 5e, the first photo-resist pattern 162A left on the first mask pattern group in FIG. 5d is removed by the stripping process.

Figure 6A:
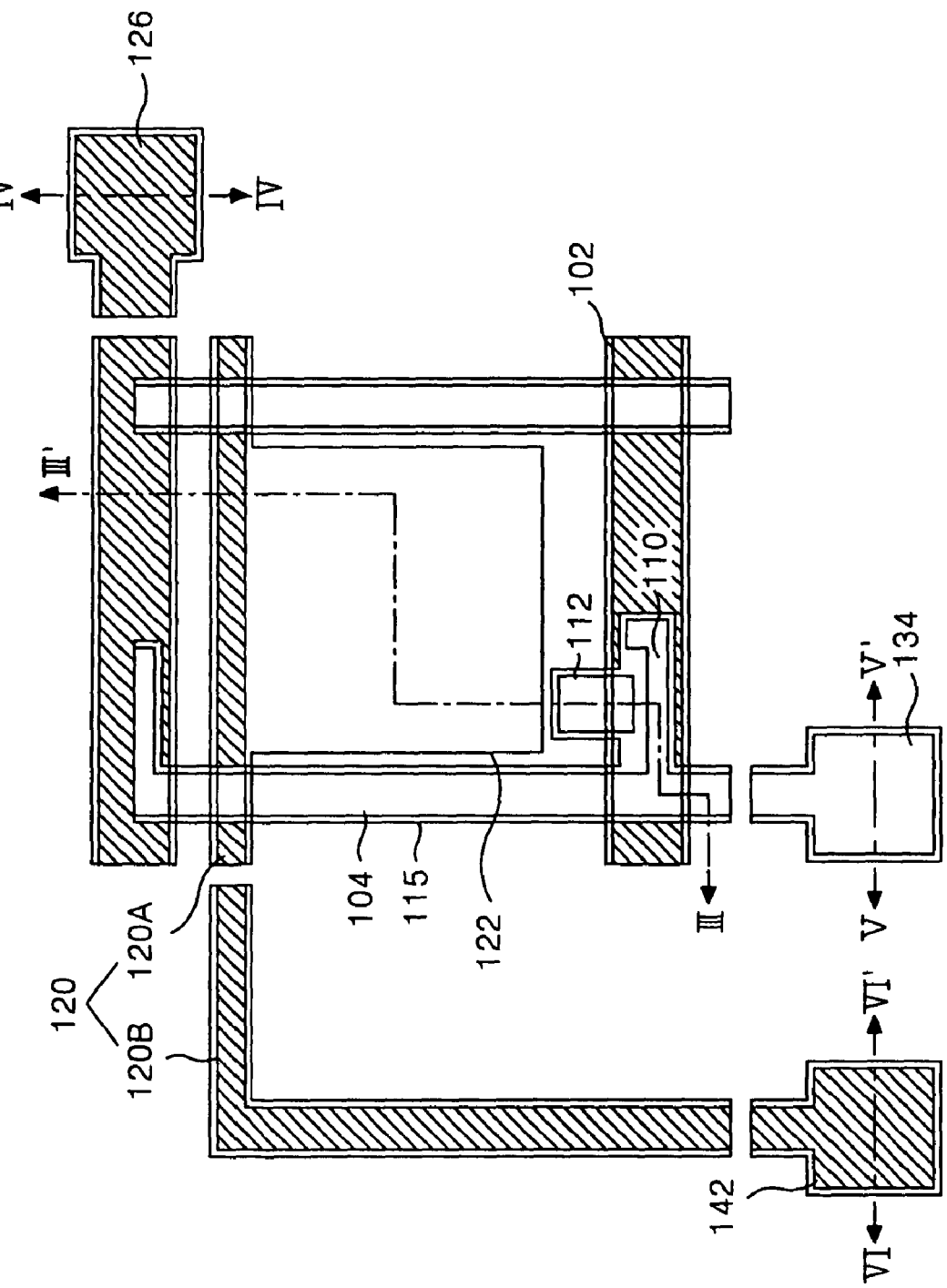

FIG. 6a and FIG. 6b are a plan view and a sectional view for explaining a second mask process in a method of fabricating the FFS-type thin film transistor substrate according to the first embodiment of the present invention, respectively, and FIG. 7a to FIG. 7e are sectional views illustrating the second mask process.

The gate insulating film 152 is formed on the lower substrate 150 provided with the first mask pattern group, and the semiconductor pattern 115 including the active layer 114 and ohmic contact layer 116, and the source/drain metal pattern including the data line 104, the source electrode 110, the drain electrode 112 and the lower data pad electrode 134 are disposed on by the second mask process. The semiconductor pattern 115 and the source/drain metal pattern are defined by a single of mask process employing a diffractive exposure mask or a half tone mask. Hereinafter, a case where the half tone mask is used as a second mask will be described. Hereinafter, a case where the half tone mask is used as a second mask will be described.

Figure 7A:
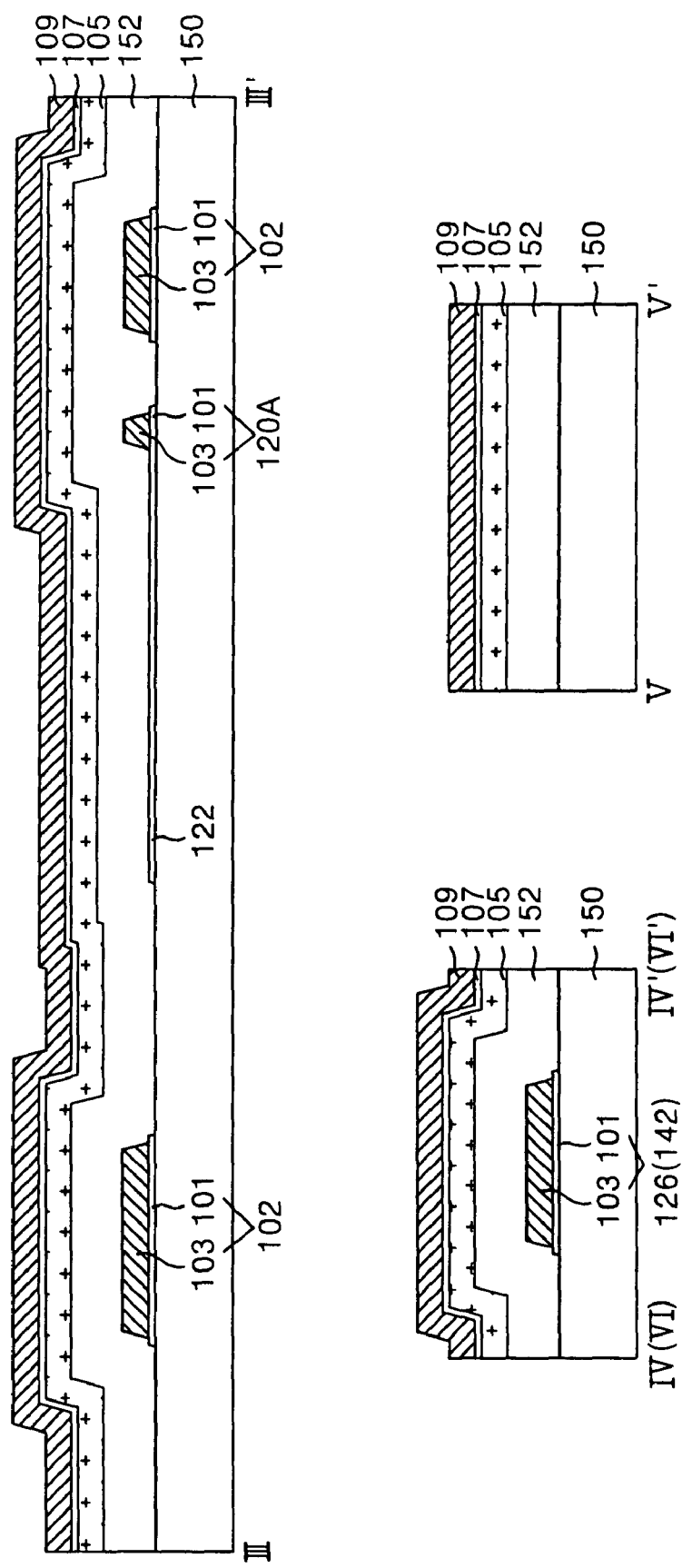

Referring to FIG. 7a, the gate insulating film 152, an amorphous silicon layer 105 and an amorphous silicon layer 107 doped with an $n^+$ or $p^+$ impurity are sequentially formed on the lower substrate 150 provided with the first mask pattern group by a deposition technique such as the PECVD; and a source/drain metal layer 109 is formed on thereon by a deposition technique such as the sputtering. Herein, the gate insulating film 152 is formed of an inorganic insulating material such as silicon oxide ($SiO_x$) or silicon nitride ($SiN_x$). The source/drain metal layer 109 employs a single layer formed of a metal material such as Mo, Ti, Cu, AlNd, Al, Cr, a Mo-alloy, a Cu-alloy or an Al-alloy, or employs a double layer or a triple layer such as Al/Cr, Al/Mo, Al(Nd)/Al, Al(Nd)/Cr, Mo/Al (Nd)/Mo, Cu/Mo, Ti/Al(Nd)/Ti, Mo/Al, Mo/Ti/Al(Nd), Cu-alloy/Mo, Cu-alloy/Mo-alloy, Cu-alloy/Al-alloy, Al/Mo-alloy, Mo-alloy/Al, Al-alloy/Mo-alloy, Mo-alloy/Al-alloy, Mo/Al-alloy, Cu/Mo-alloy and Cu/Mo(Ti).

Referring to FIG. 7b, a second photo-resist pattern 182 having step coverage is formed by the photolithography using a diffractive exposure mask. The diffractive exposure mask is comprised of a shielding part for shielding an ultraviolet ray, a diffractive exposure part for diffracting the ultraviolet ray using a diffractive exposure slit, and a full transmitting part for fully transmitting the ultraviolet ray. The second photo-resist pattern 182 including a different thickness of second photo-resist patterns 182A and 182B and an aperture part is formed by the photolithography using a diffractive exposure mask. In this case, the relatively thick second photo-resist pattern 182A is provided at a shielding area P1 of the second photo-resist overlapping with the shielding part of the diffractive exposure mask; the second photo-resist pattern 182B thinner than the second photo-resist pattern 182A is provided at a diffractive exposure area P2 overlapping with the diffractive exposure part; and the aperture part is provided at an full exposure area P3 overlapping with the full transmitting part.

Referring to FIG. 7c, the source/drain metal layer 109 to an amorphous silicon layer 105 are patterned by an etching process using the second photo-resist pattern 182 as a mask, thereby providing a source/drain metal layer, and a semiconductor pattern 115 under it. In this case, the source electrode 110 and the drain electrode 112 of the source/drain metal pattern are formed in an integral structure.

Referring to FIG. 7d, a thickness of the second photo-resist pattern 182A is thinned while the second photo-resist pattern 182B is removed by the ashing process using an oxygen ($O_2$) plasma. Then, the source/drain metal pattern exposed by the removal of the second photo-resist pattern 182B and the ohmic contact layer 116 under it are removed. Thus, the source electrode 110 and the drain electrode 112 are disconnected from each other and the active layer 114 is exposed. In this case, each side of the source/drain metal pattern is again etched along the ashed second photo-resist pattern 182A, thereby allowing the source/drain metal pattern and the semiconductor pattern 115 to have a constant step coverage in a stepwise shape.

Referring to FIG. 7e, the second photo-resist pattern 182A left on the source/drain metal pattern in FIG. 7d is removed by the stripping process.

FIG. 8a and FIG. 8b are a plan view and a section view for explaining a third mask process in a method of fabricating the thin film transistor substrate according to the first embodiment of the present invention, respectively.

The protective film 154 including the first to fourth contact holes 108, 128, 136 and 144 is formed on the gate insulating film 152 provided with the source/drain pattern by the third mask process.

More specifically, the protective film 154 is formed on the gate insulating film 152 provided with the source/drain pattern by a technique such as PECVD, spin coating, or spinless coating. The protective film 154 is formed of an inorganic insulating material, or an organic insulating material. Next, the protective film 154 and gate insulating film 152 are patterned by the photolithography and an etching process using the third mask, thereby providing the first to fourth contact holes 108, 128, 136 and 144. Herein, the first and third contact holes 108 and 136 pass through the protective film 154 to expose the drain electrode 112 and lower data pad electrode 134, and the second and fourth contact holes 128 and 144 pass through the protective film 154 and gate insulating film 152 to expose the lower gate pad electrode 126 and lower common pad electrode 142, respectively.

Figure 9A:
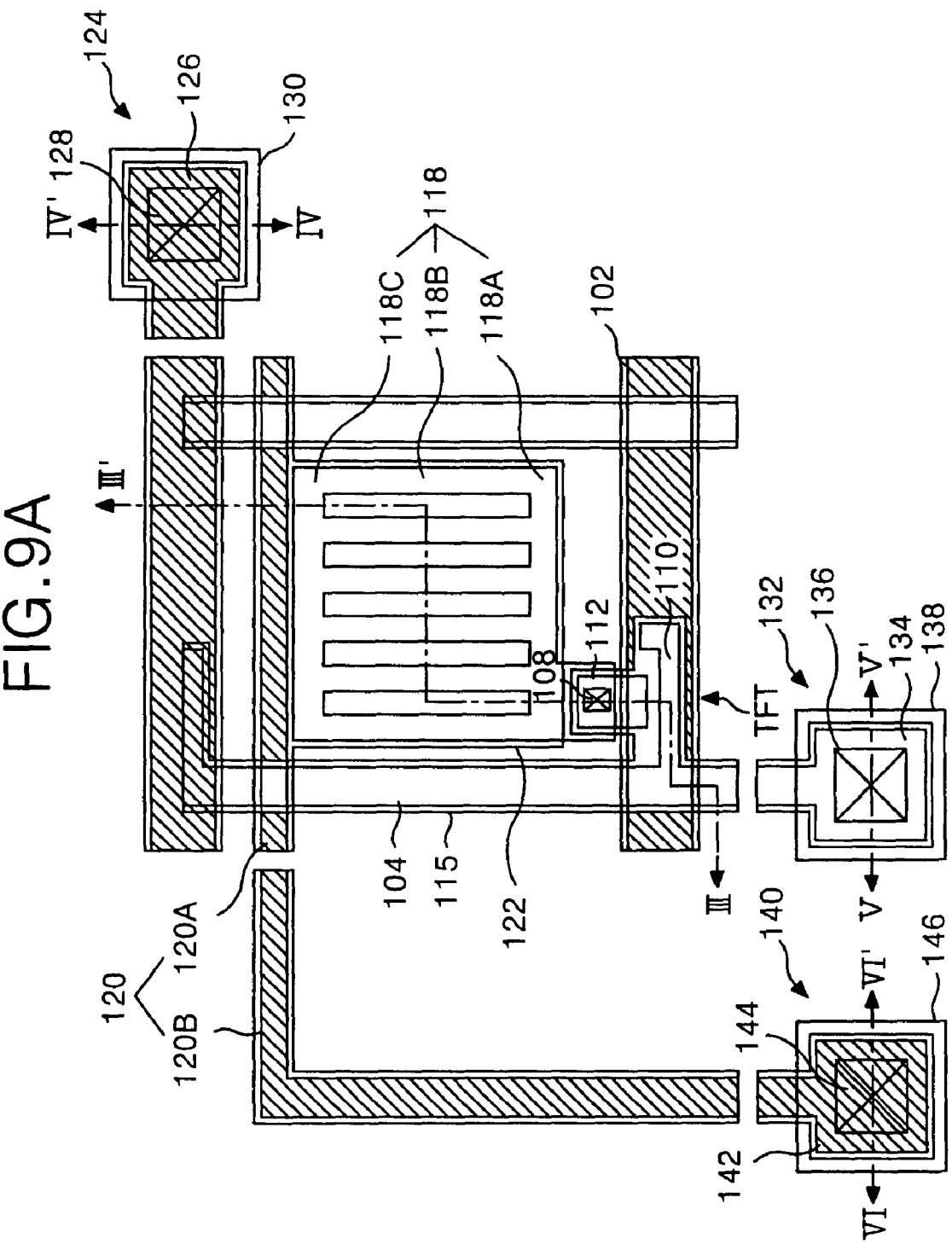

FIG. 9a and FIG. 9b are a plan view and a sectional view for explaining a fourth mask process in a method of fabricating the thin film transistor substrate according to the first embodiment of the present invention, respectively.

A transparent conductive pattern including the pixel electrode 118, the upper gate pad electrode 130, the upper data pad electrode 138 and the upper common pad electrode 146 is formed on the protective film 154 by the fourth mask process.

More specifically, the transparent conductive layer is formed by a deposition technique such as the sputtering, etc, on the protective film 154. The transparent conductive layer employs one of ITO, TO, IZO or ITZO or the like, as does the first conductive layer 101 of the gate and common patterns. Next, the transparent conductive layer is patterned by the photolithography and an etching process using the fourth mask to thereby provide the transparent conductive pattern including the pixel electrode 118, the upper gate pad electrode 130, the upper data pad electrode 138 and the upper common pad electrode 146. Herein, the pixel electrode 118, the upper gate pad electrode 130, the upper data pad electrode 138 and the upper common pad electrode 146 are connected to the drain electrode 112, the lower gate pad electrode 126, the lower data pad electrode 134 and the lower common pad electrode 142 exposed through the first to fourth contact holes 108, 128, 136 and 144, respectively. For example, the pixel electrode 118, the upper gate pad electrode 130, the upper data pad electrode 138 and the upper common pad electrode 146 contact with the surfaces of the drain electrode 112, the lower gate pad electrode 126, the lower data pad electrode 134 and the lower common pad electrode 142, respectively.

On the other hand, if the second conductive layers 103 of the gate pattern and the common pattern and the source/drain pattern are formed of a metal that can easily dry-etched, such as Mo, etc, then the pixel electrode 118, the upper gate pad electrode 130, the upper data pad electrode 138 and the upper common pad electrode 146 contact with the drain electrode 112, the lower gate pad electrode 126, the lower data pad electrode 134 and the lower common pad electrode 142 on a side basis, respectively. This is caused by a fact that, when the protective film 154 and the gate insulating film 152 are patterned by the third mask process, the second and fourth contact holes 128 and 144 pass through the second conductive layers 103 of the lower gate pad electrode 126 and the lower common pad electrode 142 while the first and third contact holes 108 and 136 pass through the drain electrode 108 and the lower data pad electrode 134. Particularly, the first and third contact holes 108 and 136 may pass through the semiconductor pattern 115 positioned under the drain electrode 108 and the lower data pad electrode 134, or further may be extended until a portion of the gate insulating film 152.

Figure 10:
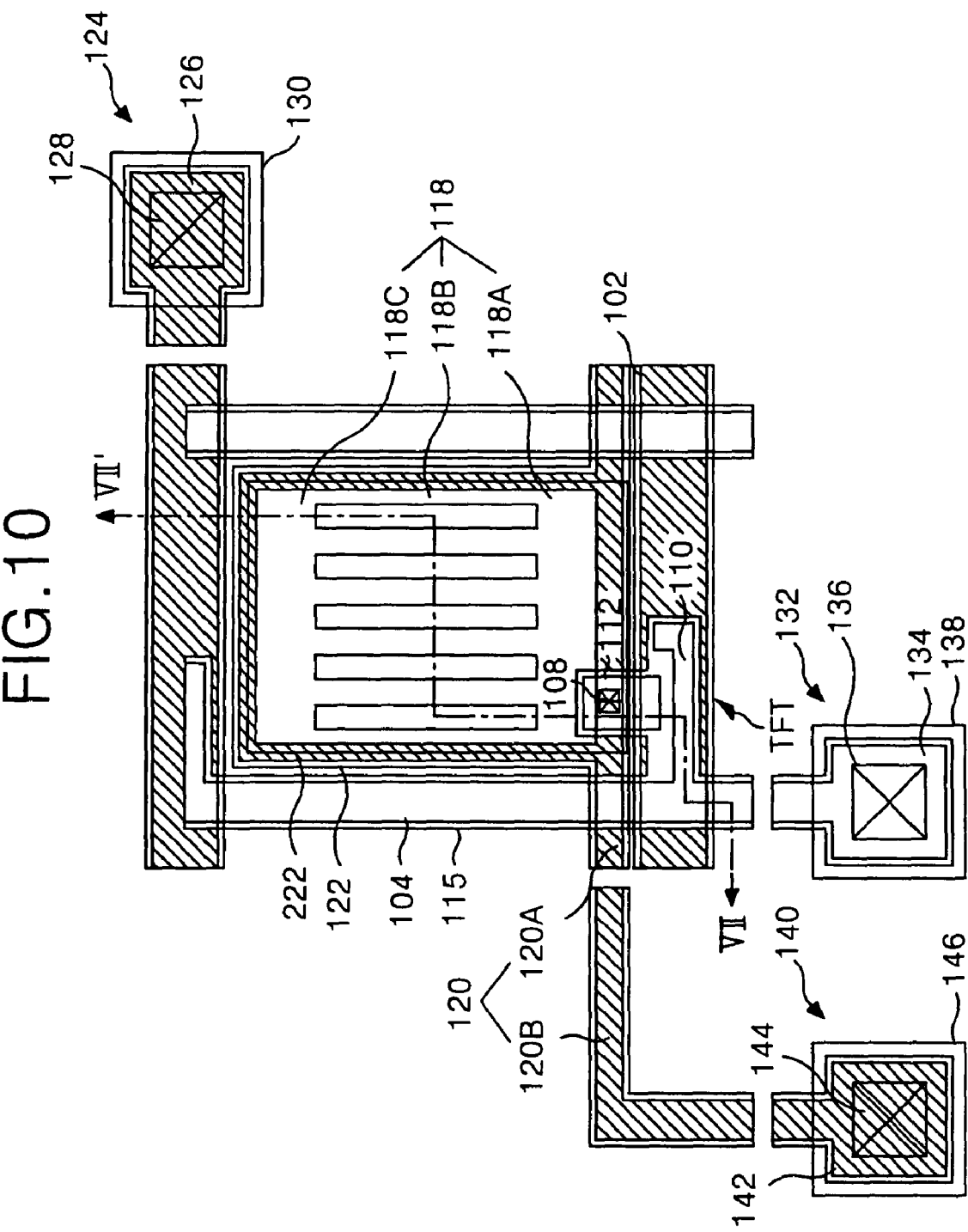
FIG. 10 is a plan view illustrating a structure of a thin film transistor substrate of fringe field switching type according to a second embodiment of the present invention.
Figure 11:
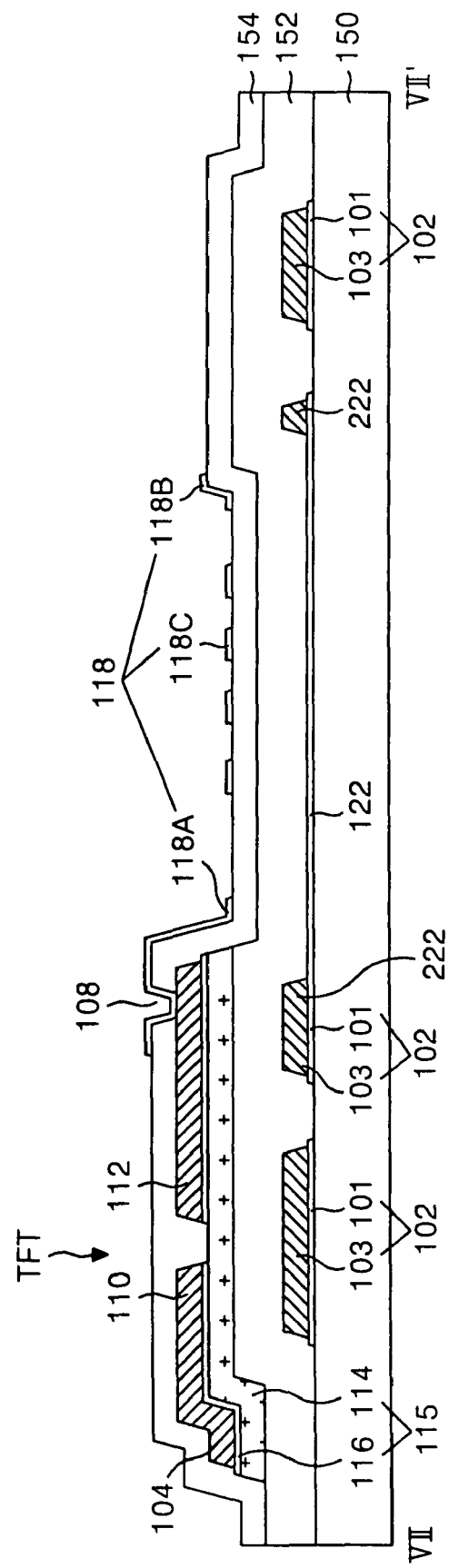
FIG. 11 is a sectional view of the thin film transistor substrate taken along the VII-VII' line in FIG. 10.

FIG. 10 is a plan view illustrating a structure of a thin film transistor substrate of fringe field switching type according to a second embodiment of the present invention, and FIG. 11 is a sectional view of the thin film transistor substrate taken along the VII-VII' line in FIG. 10.

The FFS-type thin film transistor substrate illustrated in FIG. 10 and FIG. 11 has the same elements as the FFS-type thin film transistor substrate illustrated in FIG. 2 and FIG. 3 except that it further includes at least one shielding pattern enclosing the pixel area. Therefore, an explanation as to the same elements will be omitted.

In the FFS-type thin film transistor substrate according to the second embodiment of the present invention, the internal common line 120A is overlapped with the drain electrode 112 of the TFT and provided in parallel to the gate line. A shielding pattern 222 is formed, along at least one outer side of the common electrode 122, on the common electrode 122 connected to the internal common line 120A. Such a shielding pattern 222 plays a role to reduce a light leakage phenomenon between the data line 104 and the pixel electrode 118 and between the gate line 102 and the pixel electrode 118. Further, the shielding pattern 222 has a structure in which the second conductive layer is built on the common electrode 122. The shielding pattern 222 disposed on the common electrode 122 can lower a resistance component of the common electrode 122 formed of a transparent conductive material having a relatively high resistance component. As described above, the resistance component may be reduced by the shielding pattern 222 disposed on the common line 120, so that it becomes possible to provide a low resistance common line.

Figure 12:
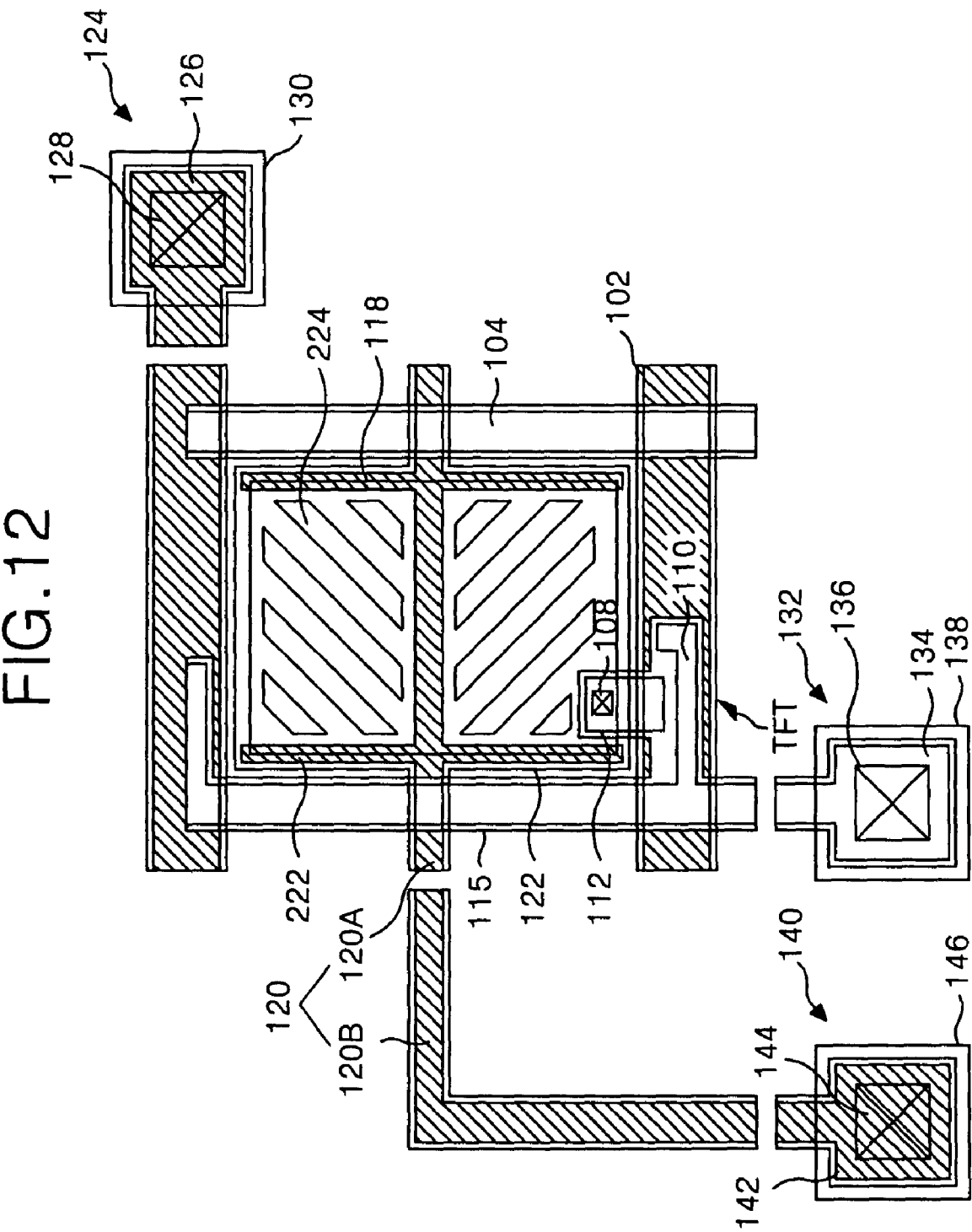
FIG. 12 is a plan view illustrating a structure of a thin film transistor substrate of fringe field switching type according to a third embodiment of the present invention.

FIG. 12 is a plan view illustrating a structure of a thin film transistor substrate of fringe field switching type according to a third embodiment of the present invention.

The FFS-type thin film transistor substrate illustrated in FIG. 12 has the same elements as the FFS-type thin film transistor substrate illustrated in FIG. 2 and FIG. 3 except that the pixel electrode has a symmetrical structure on a basis of the common line. Therefore, an explanation as to the same elements will be omitted.

The pixel electrode 118 overlaps with the common electrode 122 with the gate insulating film 153 and protective film 154 therebetween to form a fringe field. Such a pixel electrode 118 is formed in a symmetrical structure on a basis of the internal common line 120A. In other words, a hole 224 passing through the pixel electrode 118 located at the upper portion thereof on a basis of the internal common line 120A is formed in a first direction while a hole 224 passing through the pixel electrode 118 positioned on the lower portion thereof on the basis of the internal common line 120A is formed in a second direction that is symmetrical with the first direction. The pixel electrode 118 provided with the hole 224 has a multi-domain structure in which alignment directions of the liquid crystal are symmetrical to each other within the pixel area.

Further, the thin film transistor substrate of fringe field switching (FFS) type according to the third embodiment of the present invention is provided with at least one shielding pattern 222 extended, in parallel to the data line 104, from the internal common line 120A. The shielding pattern 222 is formed between the data line 104 and the pixel electrode 118 to thereby prevent a light leakage phenomenon occurring between them. Furthermore, the shielding pattern 222 is formed of the second conductive layer on the common electrode 122, thereby playing a role to reduce a resistance component of the common electrode 122 formed from a transparent conductive material having a relatively high resistance component. Otherwise, such a shielding pattern 222 may not be provided. Alternatively, the shielding pattern 222 may be formed along the outer side of the common electrode 122 like the second embodiment.

As described above, in the thin film transistor substrate of fringe field switching (FFS) type and a fabricating method thereof according to the present invention, the common electrode formed of a transparent conductive layer is provided, along with the first mask pattern group including a double layer structure of the gate line and the common line containing the transparent conductive layer by a single of mask process.

Accordingly, the entire process may be simplified by the four-round mask process, so that it becomes possible to reduce the material cost and the equipment investment cost as well as to improve the productivity.

Although the present invention has been explained by the embodiments illustrated in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device, comprising:
a multiple-layer structure gate line having a transparent conductive layer;
a data line crossing the gate line to define a pixel area;
a thin film transistor connected to the gate line and the data line;
a common line formed in parallel to the gate line and having the multiple-layer structure;
a common electrode formed by an extension of a transparent conductive layer of the common line in the pixel area; and
a pixel electrode connected to the thin film transistor to form a fringe field with the common electrode in the pixel area.

2. The device as claimed in claim 1, wherein a storage capacitor provided such that the common electrode overlaps with the pixel electrode with an insulating film.

3. The device as claimed in claim 1, wherein the common electrode has a plate shape and the pixel electrode has a rib shape.

4. The device as claimed in claim 1, wherein the pixel electrode overlaps with the common electrode with a gate insulating film between the gate line and data line and a protective film on the data line.

5. The device as claimed in claim 4, wherein the pixel electrode is connected to a drain electrode of the thin film transistor via a contact hole passing through the protective film.

6. The device as claimed in claim 1, wherein a semiconductor pattern extends along the data line.

7. The device as claimed in claim 1, further comprising:
a pad connected to at least one of the gate line, the data line and the common line,
wherein the pad includes:
a lower pad electrode connected to the at least one line; and
an upper pad electrode connected to the lower pad electrode via the contact hole.

8. The device as claimed in claim 7, wherein the lower pad electrode connected to the at least one of the common line and gate line having a multiple-layer structure.

9. The device as claimed in claim 7, wherein the lower pad electrode connected to the data line overlaps with the semiconductor pattern extended along the data line.

10. The device as claimed in claim 1, wherein the multiple-layer structure having the transparent conductive layer is a layer structure having the transparent conductive layer and the upper conductive layer and having step coverage taking a stepwise shape.

11. The device as claimed in claim 1, further comprising:
a shielding pattern on the common electrode along at least one outer side of the common electrode.

12. The device as claimed in claim 1, wherein the pixel electrode is formed on a basis of the common line.

13. The device as claimed in claim 12, further comprising at least one shielding pattern extended, in parallel to the data line, from the common line.

14. The device as claimed in claim 12, further comprising a shielding pattern formed along at least one outer side of the common electrode.

* * * * *